(12) United States Patent
Felber

(10) Patent No.: US 11,421,783 B2
(45) Date of Patent: Aug. 23, 2022

(54) SPREADER STRUCTURE FOR A RING SEAL FOR SEALING AN ANNULAR GAP

(71) Applicant: Winfried Felber, Monheim (DE)

(72) Inventor: Winfried Felber, Monheim (DE)

( * ) Notice: Subject to any disclaimer, the term of this patent is extended or adjusted under 35 U.S.C. 154(b) by 155 days.

(21) Appl. No.: 16/929,514

(22) Filed: Jul. 15, 2020

(65) Prior Publication Data

US 2021/0018095 A1    Jan. 21, 2021

(30) Foreign Application Priority Data

Jul. 18, 2019    (DE) .......................... 102019119574.8

(51) Int. Cl.
*F16J 15/02*    (2006.01)
*F16L 41/08*    (2006.01)

(52) U.S. Cl.
CPC ........... *F16J 15/028* (2013.01); *F16L 41/088* (2013.01)

(58) Field of Classification Search
CPC ........ F16J 15/028; F16J 15/021; F16L 41/088
See application file for complete search history.

(56) References Cited

U.S. PATENT DOCUMENTS

| 999,767 | A | * | 8/1911 | Felbinger | F16J 15/20 |
| | | | | | 277/531 |
| 1,873,859 | A | * | 8/1932 | Bailey | F16J 15/28 |
| | | | | | 277/545 |
| 1,927,310 | A | * | 9/1933 | Edwards | E21B 29/005 |
| | | | | | 166/301 |
| 2,226,067 | A | | 12/1940 | Morgan | |
| 2,546,377 | A | * | 3/1951 | Turechek | E21B 33/1293 |
| | | | | | 166/134 |
| 3,227,464 | A | * | 1/1966 | Makin | F16J 15/20 |
| | | | | | 277/531 |
| 6,394,140 | B1 | | 5/2002 | Peacock et al. | |

(Continued)

FOREIGN PATENT DOCUMENTS

DE    202015102252 U1    7/2015
DE    202016106736 U1    6/2017

(Continued)

OTHER PUBLICATIONS

German Search Report in corresponding German Application No. 102019119574.8, dated Feb. 27, 2020.

(Continued)

*Primary Examiner* — Gilbert Y Lee
(74) *Attorney, Agent, or Firm* — Bacon & Thomas, PLLC

(57) ABSTRACT

A spreader structure for a ring seal for sealing an annular gap, includes a radially inner first component with an inner contact surface, a radially outer second component with an outer contact surface, and a first spreading mechanism formed between these two components that includes a first spreading bevel formed on one of the two components, and a first spreading element formed on the other component, that can be moved along the first spreading bevel. The two components can be displaced in relation to one another, from an assembly state to a spreading state, by means of which the first spreading element is moved from a first section of the first spreading bevel to a second section of the spreading bevel, enlarging a radial spacing between the inner contact surface and the outer contact surface. The spreader structure has a second spreading mechanism.

26 Claims, 19 Drawing Sheets

(56) References Cited

U.S. PATENT DOCUMENTS 7,121,554 B2 * 10/2006 Lugovskoy .............. F16J 15/56
                                                       277/541
9,334,990 B2    5/2016 Nijsen

FOREIGN PATENT DOCUMENTS

| EP | 0303044 A2 | 7/1988 |
| GB | 526698 | 3/1939 |
| WO | 2007055576 A1 | 11/2006 |
| WO | 2007055576 A1 | 5/2007 |
| WO | 2008010755 A1 | 1/2008 |

OTHER PUBLICATIONS

European Search Report in corresponding European Application No. 20186353.7, dated Nov. 24, 2020.

* cited by examiner

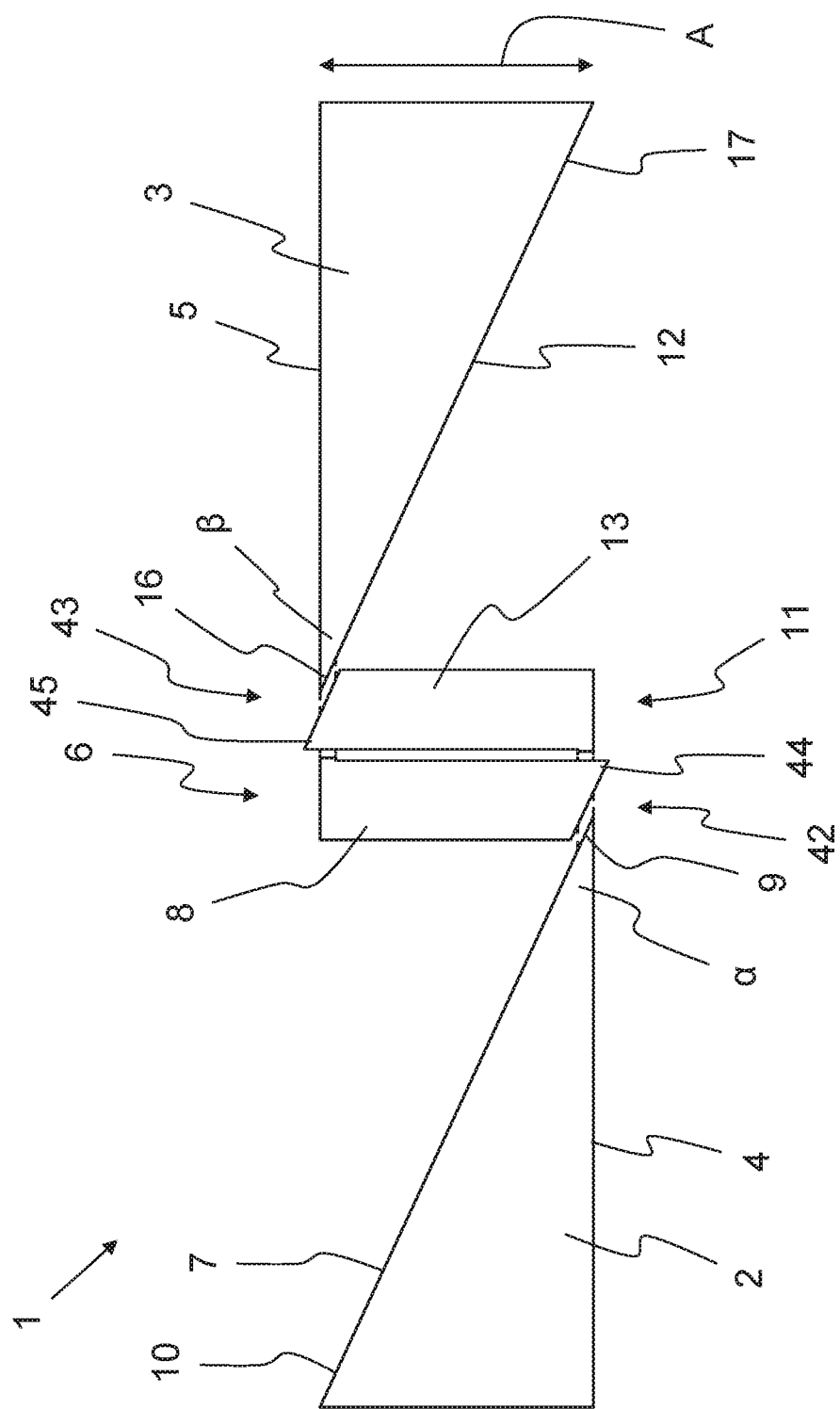

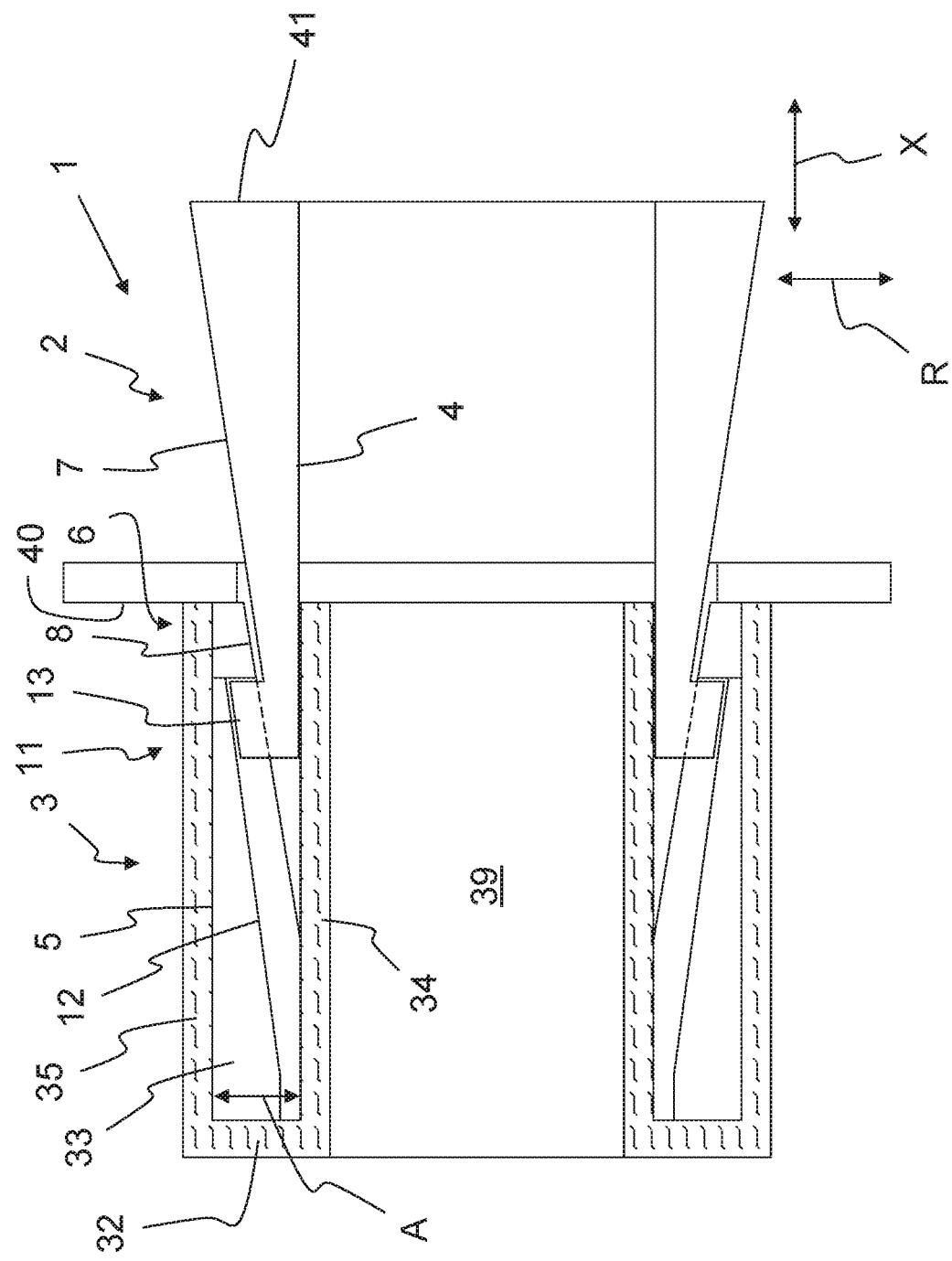

SPREADER STRUCTURE FOR A RING SEAL FOR SEALING AN ANNULAR GAP

The present invention relates to a spreader structure for a ring seal for sealing an annular gap with a radially inner first component, comprising an internal contact surface, a radially outer second component, which has an outer contact surface, and a first spreading mechanism formed between these two components that comprises a first spreading bevel formed on one of the two components and a first spreading element formed on the other component, that can move along the first spreading bevel, wherein the two components can be displaced in relation to one another in the axial direction of the spreader structure from an assembly state to a spreading state, by means of which the first spreading element is moved from a first section of the guide bevel to a second section of the guide bevel, enlarging a radial spacing between the inner contact surface and the outer contact surface. The invention also relates to a sealing assembly with such a spreader structure.

BACKGROUND OF THE INVENTION

A sleeve adapter with a seal is known from DE 20 2015 102 252 U1. The seal is spread by a wedge and a counter bearing, in that the wedge is driven into the counter bearing. The disadvantage with this is that the seal is not spread reliably.

The object of the present invention is therefore to improve the prior art.

SUMMARY OF THE INVENTION

This object is achieved by a spreader structure and a sealing assembly that have the features of that are disclosed by the present specification and drawings.

A spreader structure for a ring seal for sealing an annular gap is proposed. The annular gap is formed, e.g., between an element, in particular a tube or a pipe, and a hole in a wall. It is clear from this example that the hole through the wall must be larger than the diameter of the tube or pipe. This results in an annular gap that must be sealed in order to prevent water from entering through the hole. The annular gap can also be formed between other components.

The annular gap does not need to be in the form of a ring. The annular gap can also be oval or elliptical to a certain extent, for example, if the hole in the wall is not perfectly circular.

Additionally or alternatively, the tube also does not have to have a circular cross section. The tube can likewise be elliptical or oval.

For purposes of simplicity, the invention shall be explained using the example of an annular gap between a tube and a hole in a wall.

The spreader structure comprises a radial inner first component that has an inner contact surface. The inner contact surface faces the tube. The ring seal can bear on the inner contact surface, such that the inner contact surface presses the ring seal against the tube. The inner contact surface can press the ring seal radially inward.

Furthermore, the spreader structure has a radial outer second component that has an outer contact surface. The outer contact surface faces away from the tube. The outer contact surface faces the wall bore hole. The ring seal can bear on the outer contact surface, such that the outer contact surface presses the ring seal in the hole against the wall. The outer contact surface can press the ring seal radially outward. The two components correspond to one another.

The spreader structure also comprises a first spreading mechanism formed between these components. The first spreading mechanism also comprises a first spreading bevel formed on one of the two components, and a first spreading element formed on the other component, that can move along the first spreading bevel. The first spreading bevel can be slanted, e.g. in the axial direction. The first spreading bevel can rise in the axial direction. The first spreading bevel can extend in the axial direction.

Additionally or alternatively, the first spreading bevel can extend in the radial direction of the spreader structure.

Furthermore, both components can be displaced in relation to one another in the axial direction of the spreader structure. The two components can thus be displaced in opposite directions in the axial direction of the spreader structure. The two components can also be moved from an assembly state to a spreading state. When in the assembly state, the spreader structure can be placed in the wall bore hole, e.g., between the tube and the wall. In the spreading state, the ring seal then seals the annular gap. The spreader structure presses the ring seal against the tube and/or the wall within the wall bore hole when in the spreading state.

By moving the components from the assembly state to the spreading state, the first spreading element is moved from a first section of the spreading bevel to a second section of the spreading bevel. The first section can be a radially inward section, and the second section can be a radially outward section, for example. The first spreading element can therefore be moved along the spreading bevel in the radial direction.

As a result, a radial spacing is increased between the inner contact surface and the outer contact surface. Consequently, the ring seal is pressed against the tube and/or the wall within the wall bore hole.

According to the invention, the spreader structure has a second spreading mechanism formed between these two components. The radial spacing between the inner contact surface and the outer contact surface can likewise be increased with this second spreading mechanism.

Furthermore, the two spreading mechanisms are offset to one another in the axial direction of the spreader structure. The two spreading mechanisms therefore exhibit a spacing in the axial direction. Consequently, the two components bear on one another in the axial direction at two different points when their radial spacing is increased. This means it is possible to prevent the two components from tilting in relation one another, for example. The spacing between the two components can therefore be increased in a uniform manner in the axial direction over a specific length. As a result, the ring seal can be pressed uniformly against the tube and/or the wall.

It is advantageous when the two components have a shared first supporting region formed by the first spreading mechanism, and a second supporting region that is axially offset to the first supporting region, which is formed by the second spreading mechanism. As a result, the two components bear on one another at the points formed by the two supporting regions. The components are consequently prevented from tilting in relation to one another.

It is advantageous when the two spreading mechanisms are separate from one another. This results in a material reduction between the two spreading mechanisms, such that the spreader structure on the whole is lighter.

It is advantageous when the two spreading mechanisms are offset to one another in the radial direction of the spreader structure.

It is advantageous when the inner contact surface and the outer contact surface are parallel. This is advantageous when the tube section that bears on the ring seal and the wall section in the wall bore hole on which the ring seal bears, are parallel.

Additionally or alternatively, it is also advantageous when the two spreading mechanisms are formed such that the inner contact surface and the outer contact surface can be displaced parallel to one another. As a result, the orientation of the two components to one another remains unchanged, or the same. The ring seal can be pressed evenly against the tube and/or the wall.

It is advantageous when the second spreading mechanism comprises a second spreading bevel formed on one of the two components, and a second spreading element formed on the other component, that can be moved along the second spreading bevel. The second spreading bevel can also extend axially and/or radially. By way of example, the second spreading bevel can slant upward in the axial direction. The second spreading element can be displaced via the second spreading bevel, such that a radial spacing between the two components is increased, wherein the radial spacing between the inner contact surface and the outer contact surface is also increased.

It is advantageous when one of the two components contains both spreading bevels, and the other component contains both spreading elements. The two spreading bevels are thus formed on one component. The spreading elements are thus formed on the corresponding, other component.

It is advantageous when one of the two components contains the spreading bevel for the one spreading mechanism, and the spreading element for the other spreading mechanism.

It is advantageous when the spreading bevels of the two spreading mechanisms are offset to one another in the axial direction.

Additionally or alternatively, the spreading elements of the two spreading mechanisms can also be offset to one another in the axial direction of the spreader structure.

Additionally or alternatively, the spreading bevels of the two spreading mechanisms can also be offset to one another in the radial direction of the spreader structure.

Additionally or alternatively, the spreading elements of the two spreading mechanisms can also be offset to one another in the radial direction of the spreader structure.

It is advantageous when the spreading bevels of the two spreading mechanisms are offset parallel to one another. As a result, a displacement vector, by which the two spreading bevels are offset parallel to one another, can be parallel to the axial direction. The two spreading bevels can have an offset, wherein both spreading bevels are offset parallel to one another. As a result, the two spreading mechanisms can be offset in the axial direction. Consequently, the two supporting points for the two components can oppose one another and be spaced apart in the axial direction. Furthermore, it is possible to obtain a compact structure in which the radial spacing between the inner and outer contact surfaces is increased.

It is advantageous when the spreading bevels of the two spreading mechanisms have the same slant. As a result, the two components remain parallel to one another, in particular the inner and outer contact surfaces, even when they are displaced in relation to one another to increase the radial spacing. Additionally or alternatively, the spreading bevels of the two spreading mechanisms can be parallel to one another.

It is advantageous when the spreader structure has a first guide mechanism formed between the two components, for guiding the two components in the axial direction of the spreader structure. Additionally or alternatively, the spreader structure can also have a second guide mechanism formed between the two components. The first and/or second guide mechanisms can also prevent the two components from twisting in relation to one another. The twisting safeguard can be formed about the radial direction.

It is advantageous when the first and second guide mechanisms are offset to one another in the axial direction of the spreader structure, such that the two components are guided axially at two different points. This results in a two-point guidance, for example.

It is advantageous when the guide mechanism comprises an axial guide groove and a guide element in the axial guide groove. The axial guide groove is formed in one component, and the guide element is formed in the other component in this case. The guide element can therefore move axially in the axial guide groove, but not in a transverse direction thereto. The transverse direction can be the circumferential direction of the spreader structure.

It is advantageous when the guide element has a first undercut at its free end, which extends in the circumferential direction of the spreader structure, which engages in a form fitting manner in a corresponding second undercut in the axial guide groove, such that the two components are coupled in a form fitting manner to one another in the radial direction of the spreader structure. As a result, the two components cannot be pulled apart in the radial direction. The two components remain coupled in the radial direction.

It is advantageous when the axial guide groove widens at one of its axial ends, such that the first undercut in the guide element can be inserted radially in the axial guide groove to assemble the spreader structure. The axial guide groove therefore has an insertion region for the first undercut in this region.

It is advantageous when a first axial guide groove of the first guide mechanism is formed in the first spreading bevel. Additionally or alternatively, it is advantageous when a first guide element of the first guide mechanism is formed on the first spreading element. This results in a compact design of the spreader structure.

It is advantageous if the first guide element is formed as a radial extension of the first spreading element. The radial extension can thus engage in the axial guide groove.

It is advantageous when a second axial guide groove of the second guide mechanism is formed in the second spreading element. Additionally or alternatively, it is advantageous when a second guide element of the second guide mechanism is formed in the second spreading bevel. The two-point guidance can be formed by the second axial guide groove and/or the second guide element of the second axial guide groove.

It is advantageous when the spreader structure comprises a latching mechanism, which blocks an axial displacement of the two components toward the assembly state. The latching mechanism latches when the components are to be moved from the spreading state into the assembly state. As a result, the two components can be moved incrementally from the assembly state into the spreading state. The latching mechanism can also be designed such that it is releasable.

It is advantageous when the latching mechanism has a serrated latching surface and a corresponding elastic latching element. The serrated latching surface can be formed on one of the two components, and the latching element can be formed on the other component.

It is advantageous when the serrated latching surface is formed in the second spreading bevel. Additionally or alternatively, the elastic latching element can be formed on the second spreading element. This results in a compact design of the latching mechanism, and thus the spreader structure.

It is advantageous when at least the two corresponding components form a spreader unit with their two spreading mechanisms, and the spreader structure comprises numerous spreader units distributed over the circumference that form a spreader ring. The spreader ring can also be closed. The spreader units are thus the individual links of the spreader ring. The spreader units can be connected to one another, in particular releasably or permanently. The spreader units can be joined to one another arbitrarily, such that the spreader ring can be practically any size.

It is advantageous when the spreader ring is formed by an inner spreader ring comprising the first components. Additionally or alternatively, the spreader ring can be formed by an outer spreader ring comprising the second components. The first and/or second components can likewise be joined in individual links to form the inner and/or outer spreader ring, in particular releasably or permanently. As a result, the spreader ring can have a modular design.

It is advantageous when the outer spreader ring has a supporting surface with which the spreader structure can bear axially on the wall and/or the ring seal. This prevents the spreader structure from moving against the wall and/or the ring seal.

Additionally or alternatively, it is advantageous when the inner spreader ring has a striking surface on one end, via which a displacement force can be exerted to axially displacing the inner spreader ring. A hammer can be used to strike the striking surface in order to move the two components from the assembly state into the spreading state.

Additionally or alternatively, the two components can also be displaced in relation to one another with an actuator, e.g. a hydraulic actuator, or a hydraulic piston. The hydraulic actuator can be attached to the tube, for example, such that it can displace the two components in relation to one another in the axial direction.

It is advantageous when an empty space is formed between two adjacent first and/or second components in the circumferential direction of two adjacent spreader units, such that they can move toward one another in the circumferential direction. The empty space can thus increase or decrease in size.

It is also advantageous when adjacent components in the circumferential direction are connected by at least one flexible connecting element that bridges the empty space. As a result, the spreader structure, in particular the inner and/or outer spreader rings can be expanded and/or compressed. This facilitates the assembly, in that the spreader structure can be expanded in order to slide the spreader structure over the tube.

A sealing assembly for sealing an annular gap between a wall bore hole and an element located in the hole with a ring seal and a spreader structure for radially compressing the ring seal. The element can be a tube, for example, which is inserted through the wall. The element can also be a pipe. The element in general is an elongated cylindrical element.

According to the invention, the spreader structure is formed in accordance with one or more of the features described above and/or below.

It is advantageous when the ring seal has an annular hollow space in which the spreader structure is at least partially located.

It is advantageous when the ring seal has a U-shaped cross section. Additionally or alternatively, the ring seal can have an opening at its lateral surface. The opening is located between the ends of the legs of the U-shaped cross section. The ring seal bears on the inner and outer contact surfaces as a result of its U-shaped cross section. Consequently, the ring seal seals against the tube and the wall bore hole. The spreader structure can be inserted through the opening into the hollow space in the ring seal.

BRIEF DESCRIPTION OF THE DRAWINGS

Further advantages of the invention are described in the following descriptions of exemplary embodiments. In the drawings:

FIG. 1c shows a schematic side view of a spreader structure with gaps;

FIG. 5 shows a schematic, partially cutaway side view of the ring seal with a spreader structure;

DETAILED DESCRIPTION OF THE INVENTION

Figure 1A:
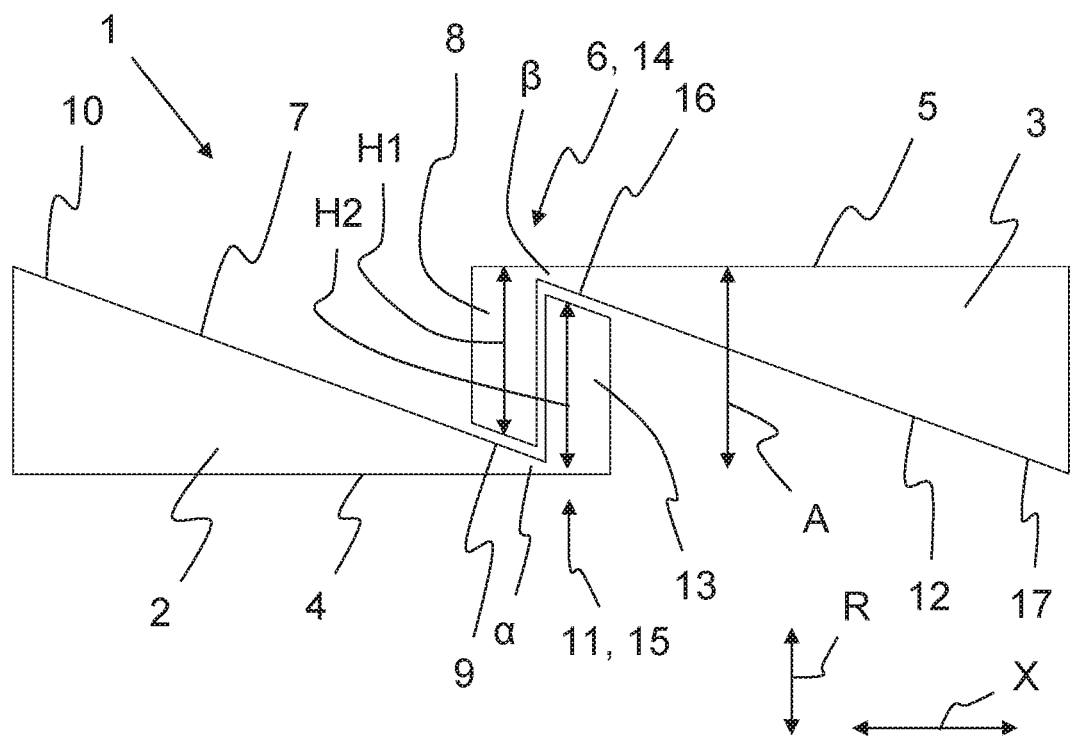
FIG. 1a shows a schematic side view of a spreader structure that has two components, in an assembly state.
Figure 1B:
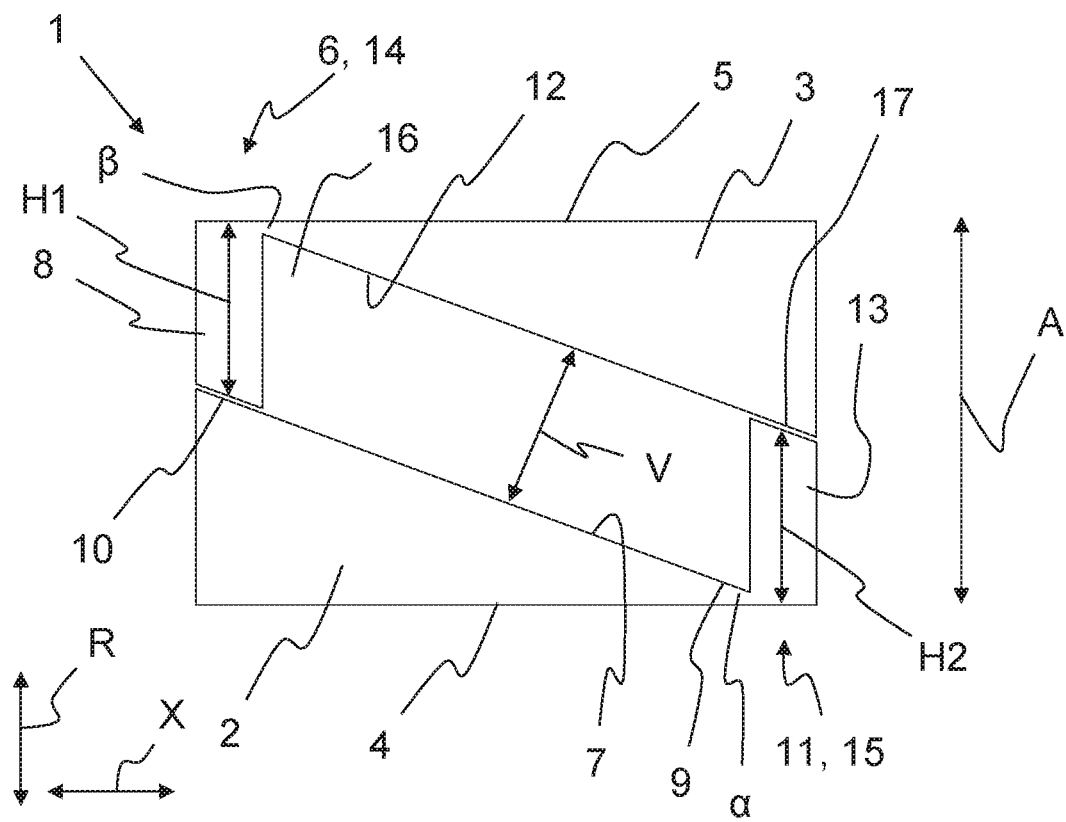
FIG. 1b shows a schematic side view of a spreader structure that has two components, in a spreading state.

FIG. 1a shows a schematic side view of a spreader structure 1 that has two components 2, 3 in an assembly state. FIG. 1b shows a schematic side view of the spreader structure 1 with two components 2, 3 in a spreading state. For purposes of simplicity, and for a better description, the functioning thereof shall be described in reference to both FIGS. 1a, and 1b. Furthermore, for purposes of simplicity, features that are described apply to both FIGS. 1a, 1b, as well as all further figures. Furthermore, identical features are provided with the same reference symbols in both FIGS. 1a, 1b, and in all further figures.

The spreader structure 1 comprises a radially inner first component 2 that has an inner contact surface 4. The spreader structure 1 also has a radially outer second component 3 that has an outer contact surface 5. The first component 2 is therefore on the inside in the radial direction R, and the second component 3 is on the outside in the radial direction R. An annular gap can be sealed with the spreader structure 1 using a ring seal 32 in an annular gap 31 (see FIGS. 4a, b and 5). The annular gap 31 is formed, e.g. between a tube 30 or a pipe and a wall bore hole 29. The spreader structure 1 can be placed on the tube 30 or the pipe, and press the ring seal 32 in the in the region of the wall bore hole 29 against the wall bore hole 29 and/or the tube 30 or the pipe, such that the annular gap 31 is sealed.

As the spreader structure 1 is placed in its intended use around the tube 30 or the pipe, the first component 2 is located on the radial inside, thus facing the tube 30. The second component 3 is located on the radial outside, thus facing the wall bore hole 29.

The inner contact surface 4 therefore faces the tube 30, and the outer contact surface 5 faces the wall bore hole 29. The ring seal 32, not shown here, can therefore bear on the inner contact surface 4 and/or the outer contact surface 5.

Furthermore, the spreader structure 1 has a first spreading mechanism 6 between the two components 2, 3. The first spreading mechanism 6 comprises a first spreading bevel 7 formed on one of the two components 2, 3, and a first spreading element 8 formed on the other component 2, 3 that can move along the first spreading bevel 7. In the present exemplary embodiment, the first spreading bevel 7 is formed on the first component 2, and the first spreading element 8 is formed on the second component 3.

The first spreading bevel 7 is slanted in relation to the axial direction X. The first spreading bevel 7 slants upward in the axial direction X.

Furthermore, the two components 2, 3 can be displaced in relation to one another in the axial direction X of the spreader structure 1, from an assembly state shown in FIG. 1a to a spreading state shown in FIG. 1b.

When the two components 2, 3 are moved from the assembly state to the spreading state, the first spreading element 8 is moved along the first spreading bevel 7. Consequently, the first spreading element 8 is displaced in the radial direction R. The first spreading element 8 is pushed outward during the displacement along the first spreading bevel 7.

The first spreading element 8 is moved from a first section 9 of the first spreading bevel 7 to a second section 10 of the first spreading bevel 7 during the displacement of the two components 2, 3 from the installation state to the spreading state. The two sections 9, 10 are spaced apart in the axial direction X. According to the present exemplary embodiment, the second section 10 is at the radial outside, and the first section 9 is radially inward therefrom.

If the first spreading element 8 is moved along the first spreading bevel 7, and thus from the first section 9 into the second section 10, the radial spacing A between the inner contact surface 4 and the outer contact surface 5 is increased. The radial spacing A in the assembly state shown in FIG. 1a is smaller than in the spreading state shown in FIG. 1b. As a result, the spreader structure 1 can be easily placed in the assembly state in the ring seal 32. Furthermore, the spreader structure 1 can be easily placed in the annular gap 31 between the tube 30 or pipe, and the wall bore hole 29 in the assembly state. When the spreader structure 1 is placed at the intended position in the annular gap 31, the spreader structure 1 can be put in the spreading state, wherein the radial spacing A is increased. Consequently, the inner and/or outer contact surfaces 4, 5 press the ring seal 32 on the tube 30 or pipe, and/or against the wall bore hole 29 from the inside, such that the annular gap 31 is sealed.

The spreader structure 1 also has a second spreading mechanism 11 formed between the two components 2, 3. The second spreading mechanism 11 is also offset to the first spreading mechanism 6 in the axial direction X, such that the two components 2, 3 are supported at two different points, separated axially from one another, in particular in the axial direction X. As a result, the inner and outer contact surfaces 4, 5 cannot twist in relation to one another. Consequently, an orientation between the inner and outer contact surfaces 4, 5, or between the two components 2, 3 is maintained, or does not change.

As the spreading mechanisms 6, 11 are spaced apart from one another in the axial direction X, at least one spreading bevel 7, 12 can slant at a lower angle $\alpha$, $\beta$, wherein the radial spacing A can nevertheless be increased substantially.

The two components 2, 3 also have a shared first supporting region 14 formed by the first spreading mechanism 6. The first supporting region 14 and the first spreading mechanism 6 are thus at the same location between the two components 2, 3. The two components 2, 3 also have a shared second supporting region 15 formed by the second spreading mechanism 11. The second supporting region 15 and the second spreading mechanism 11 are thus at the same location between the two components 2, 3. The two supporting regions 14, 15 are likewise spaced apart from one another in the axial direction X.

According to the present exemplary embodiment, the second spreading mechanism 11 has a second spreading bevel 12 formed on one of the two components 2, 3. The second spreading mechanism 11 also comprises a second spreading element 13, which is located on the other component 2, 3. According to the present exemplary embodiment, the second spreading bevel 12 is on the second component 3, and the second spreading element 13 is on the first component 2.

The second spreading bevel 12 is slanted downward in the axial direction X. The second spreading bevel 12 is slanted upward in the axial direction X.

Furthermore, the first spreading bevel 7 is at a first angle $\alpha$ to the inner contact surface 4. Besides the second spreading bevel 12 is at a second angle $\beta$ to the outer contact surface 5. According to the present exemplary embodiment, both angles $\alpha$, $\beta$ are the same, such that an orientation of the two components 2, 3 remains the same. The first and/or second angle $\alpha$, $\beta$ can be between 5° and 35°, for example.

The second spreading element 13 can also be displaced from a third section 16 to a fourth section 17 of the second spreading bevel 12. The third and fourth sections 16, 17 are offset to one another in the axial direction X. The second spreading element 13 is then displaced in the radial direction R, thus increasing the radial spacing A.

According to the present exemplary embodiment, the two spreading mechanisms 6, 11 are separate from one another. Furthermore, the two spreading mechanisms 6, 11 are offset to one another in the radial direction R according to the present exemplary embodiment.

Moreover, the inner and outer contact surfaces 4, 5 are parallel to one another according to the present exemplary embodiment. When the radial spacing A is increased, the inner and outer contact surfaces 4, 5 remain parallel to one another. As a result, the ring seal 32 can be evenly pressed against the tube 30 and/or against the wall bore hole 29.

As a result, the inner and outer contact surfaces 4, 5 can be pressed apart in parallel, as the two spreading bevels 7, 12 are at the same angle $\alpha$, $\beta$. Furthermore, the two spreading elements 8, 13 are the same height according to the present exemplary embodiment, i.e. they are at the same heights H1, H2 over the respective spreading bevels 7, 12.

In an alternative exemplary embodiment, not shown here, the two spreading elements 8, 13 can also be different heights H1, H2.

According to the present exemplary embodiment, the two spreading bevels 7, 12 are offset to one another in the axial direction X and/or the radial direction R. The two spreading bevels 7, 12 are spaced apart from one another. The two spreading bevels 7, 12 have an offset V to one another. The offset V corresponds to a spacing, in particular a shortest spacing, between the two spreading bevels 7, 12. The offset V can also be regarded as a displacement of the two spreading bevels 7, 12 in relation to one another. As a result of the offset V, the two spreading bevels 7, 12 can be displaced or offset to one another in parallel. The offset V is only shown in FIG. 1b for the sake of clarity.

FIG. 1c shows another exemplary embodiment of the spreader structure 1 in the assembly state. For purposes of simplicity, features and their functions that were already described in the reference to the preceding figures shall not be explained again. Furthermore, identical features or at least features having similar effects are given the same reference symbols as in the preceding and/or following figures. As such, some features may first be explained in reference to the following figures, for purposes of clarity.

The first component 2 has a first cutout 42 in this exemplary embodiment. The first cutout 42 is located in the inner contact surface 4. The inner contact surface 4 can entirely encompass the first cutout 42.

Furthermore, the first spreading element 8 is at least partially located in the first cutout 42. According to the present exemplary embodiment, the first spreading element 8 extends through the first cutout 42. According to the present exemplary embodiment, the first spreading element 8 extends beyond the inner contact surface 4. A first end 44 of the first spreading element 8 can pass through the cutout 42 and/or extend beyond the inner contact surface 4.

According to the present exemplary embodiment, the first spreading element 8 is at least partially located in the first section 9 of the first spreading bevel 7.

By means of the cutout 42, the first spreading bevel 7 can be steeper than the first spreading bevel in FIG. 1a. B means of the cutout 42, the first angle $\alpha$ can be greater than the first angle $\alpha$ in FIG. 1a. Consequently, the radial spacing A can be small, such that the spreader structure 1 can be readily inserted into the ring seal 32. When the two components 2, 3 are pushed into the spreading state, the radial spacing A increases significantly in accordance with the greater incline of the first spreading bevel 7. The ring seal 32 can consequently be spread substantially by means of a comparatively small axial displacement.

Furthermore, the first end 44 can hook into the ring seal 32 when the spreader structure 1 is inserted into the ring seal 32, such that the spreader structure 1 and the ring seal 32 are connected to one another.

According to the present exemplary embodiment, the second component 3 additionally or alternatively has a second cutout 43. The second cutout 43 is located in the outer contact surface 5. The outer contact surface 5 can entirely encompass the second cutout 43. The second spreading element 13 is at least partially located in the second cutout 43. The second spreading element 13 has a second end 45. The second spreading element 13 and/or its second end 45 extends at least partially into the second cutout 43 and/or beyond the outer contact surface 5.

By means of the second cutout 43, the second spreading bevel 12 can likewise be steeper. By means of the second cutout 43, the second angle $\beta$ can be greater than in FIG. 1a.

By means of the first and/or second cutout 43 and the resulting possibility of making the first and/or second spreading bevels 7, 12 steeper, the radial spacing A can be further increased with a short displacement in the axial direction X.

Figure 2A:
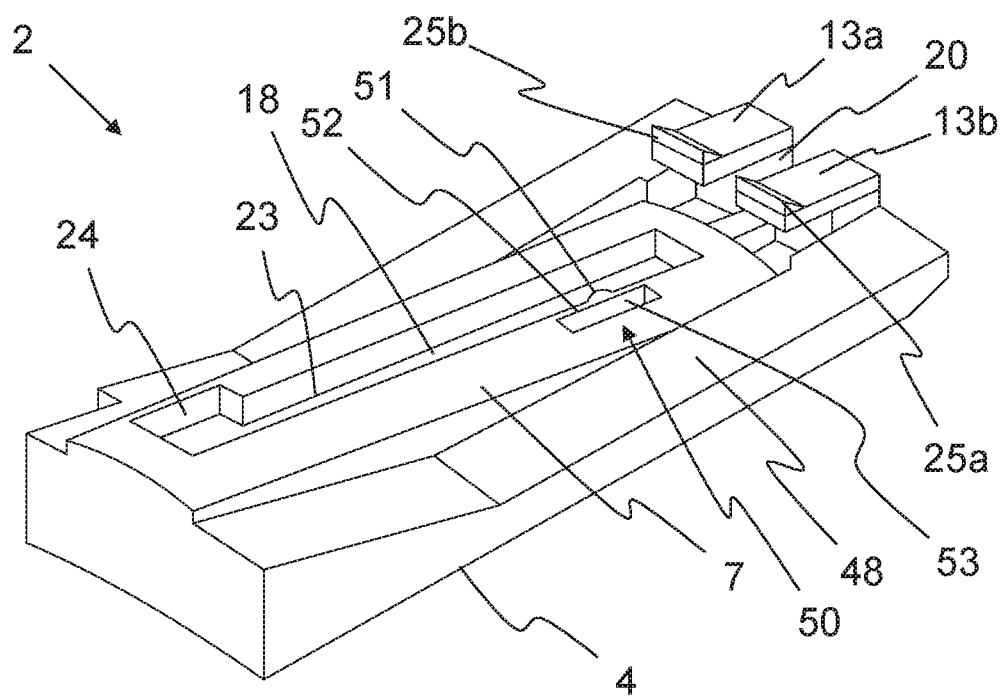
FIG. 2a shows a schematic, perspective view of a first component.
Figure 2B:
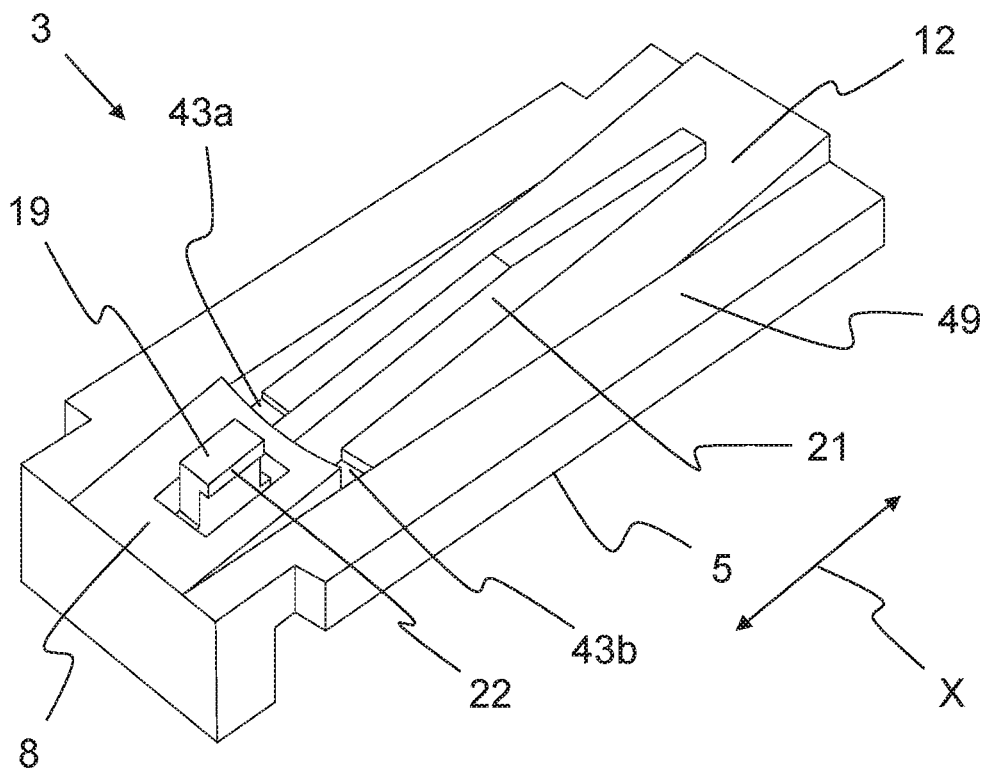
FIG. 2b shows a schematic, perspective view of a second component.

FIG. 2a shows a schematic, perspective view of an embodiment of the first component 2. FIG. 2b shows a schematic, perspective view of an embodiment of the second component 3. Both components 2, 3, and thus both FIGS. 2a, 2b shall be explained in parallel. Furthermore, for purposes of simplicity, features and their functions that have already been explained in reference to the preceding figures shall not be explained again. Furthermore, identical features or at least features having similar effects are given the same reference symbols as in the preceding and/or following figures. As such, some features may first be explained in reference to the following figures, for purposes of clarity.

It should be noted that the first component 2 in FIG. 2a is oriented substantially the same as in FIGS. 1a, 1b. In contrast, the second component 3 is oriented counter to in FIGS. 1a, 1b, i.e. the second component 3 is flipped over.

The first component 2 contains the first spreading bevel 7 and the second spreading element 13a, 13b, which has been divided into two parts here. The second component 3 contains the second spreading bevel 12 and the first spreading element 8. The first spreading bevel 7 of the first component 2 and the first spreading element 8 of the second component 3 form the first spreading mechanism 6 when the two components 2, 3 are joined. The second spreading bevel 12 of the second component 3 and the second spreading element 13a, 13b of the first component 2 form the second spreading mechanism 11 when the components 2, 3 are joined.

According to the present exemplary embodiment, the first spreading bevel 7 is curved, specifically in a convex manner. The associated first spreading element 8 is likewise curved, specifically in a concave manner. The first spreading element 8 is smooth. The two curvatures fit together, or have the same, or opposite, curvatures.

Furthermore, according to the present exemplary embodiments in FIGS. 2a, 2b, the first component 2 has a first axial guide groove 18. The second component 3 contains a first guide element 19. The first guide element 19 can be inserted into the first axial guide groove 18, such that it can move in the axial direction X in order to displace the two components 2, 3 counter to one another, from the assembly state to the spreading state.

The first axial guide groove 18 and the first guide element 19 collectively form a first guide mechanism.

Furthermore, according to the present exemplary embodiments in FIGS. 2a, 2b, the first component 2 contains a second axial guide groove 20. The second axial guide groove 20 is formed by dividing the second spreading element 13a, 13b in two. The second axial guide groove 20 is formed between the two parts of the spreading element 13a, 13b. The first and second axial guide grooves 18, 20 are parallel to one another.

The second component 3 also has a second guide element 21. The second guide element 21 can move freely in the axial direction X in the second axial guide groove 20 when the two components 2, 3 are joined. The second guide element 21 is formed as a guide rib according to the present exemplary embodiment, which extends in the axial direction X.

The two components 2, 3 can be secured against twisting in relation to one another by means of the at least one guide mechanism. The two guide mechanisms collectively form a two-point guide.

The second component 3 also has a first undercut 22 according to the present exemplary embodiment, which is located at the free end of the first guide element 19. The first guide element 19 has a hook formed by the first undercut 22. The first component also has a second undercut 23 according to the present exemplary embodiment, which is located in the first axial guide groove 18, or formed thereon. The two components 2, 3 can be joined together by the first and second undercuts 22, 23. The first undercut 22 engages in a form fitting manner in the second undercut 23 when the two components 2, 3 are coupled to one another.

The first guide element 19 also forms a radial extension, such that it can engage in the first axial guide groove 18.

The first guide element 19 is also located on the first spreading element 8 according to the present exemplary embodiment.

The first axial guide groove 18 is also located in the first spreading bevel 7 according to the present exemplary embodiment. The first spreading bevel 7 encompasses the first axial guide groove 18. This results in a compact spreader structure 1.

According to the present exemplary embodiment, the second guide element 21 is also located on the second spreading bevel 12. The second spreading bevel 12 encompasses the second guide element 21. The second guide element 21 therefore divides the second spreading bevel 12 in two. Consequently, the second spreading element 13a, 13b is also divided in two. This also results in a compact spreader structure.

Furthermore, the first axial guide groove 18 according to the present exemplary embodiment has an insertion region 24, through which the first guide element 19 can be inserted with the first undercut 22 into the first axial guide groove 18, such that the first undercut 22 engages with the second undercut 23.

Furthermore, the first component 2 according to the present exemplary embodiment has at least one latching element 25a, b which is located on the at least one second spreading element 13a, b according to the present exemplary embodiment. Two latching elements 25a, b are shown here. The second spreading bevel 12 of the second component 3 can also form a latching surface. The second spreading bevel 12 can contain ribs that are transverse to the axial direction X, i.e. running in the circumferential direction U, in which the at least one latching element 25a, b can engage. As a result, the two components 2, 3 can be displaced axially from the assembly state to the spreading state. The at least one latching element 25a, b engages in the latching surface, however, if it is attempted to move the two components 2, 3 from the spreading state into the assembly state.

In another exemplary embodiment, the at least one latching element 25a, b can be released from the latching surface in order to disassemble the spreader structure 1, for example.

According to the present exemplary embodiment, the second component 3 contains two second cutouts 43a, 43b. The cutouts 43a, 43b are located between the second spreading bevel 12 and the first spreading element 8. The latching elements 25a, 25b and/or the second spreading element 13 and/or the two spreading elements 13a, 13b can extend into and/or through the cutouts 43a, 43b.

The first component 2 in the present exemplary embodiment also has a first encompassing surface 48. Additionally or alternatively, the second component 3 in the present exemplary embodiment has a second encompassing surface 49. The first and/or second encompassing surfaces 48, 49 encompass the corresponding spreading bevels 7, 12. At least one, in particular both, of the spreading bevels 7, 12 is slanted in the axial direction X, in relation to the respective encompassing surface 48, 49. A least one, in particular both, of the spreading bevels 7, 12 can thus extend over the corresponding encompassing surfaces 48, 49. Additionally or alternatively, at least one, in particular both, of the spreading bevels 7, 12 can therefore penetrate the corresponding encompassing surfaces 48, 49.

The two encompassing surfaces 48, 49 can also be parallel to the corresponding inner and outer contact surfaces 4, 5, at least in part.

The two encompassing surfaces 48, 49 overlap, at least in part, in the assembly state, such that the two components 2, 3 support one another. In the spreading state, the two encompassing surfaces 48, 49 are spaced apart from one another.

The first component 2 according to the present exemplary embodiment also contains a locking mechanism 50. The two components 2, 3 can be locked together and/or secured in place in the assembly state by means of the locking mechanism 50. The locking mechanism 50 has a locking element 51 for this. The first guide element 19 can be locked in place on the locking element 51 such that both components 2, 3 are locked and/or secured in place in relation to one another in the assembly state. The first guide element 19 can be pushed away from the insertion region 24 along the first axial guide groove 18 after it has been inserted in the first axial guide groove 18 via the insertion region 24. The two components 2, 3 are then pushed into the assembly state. If the first guide element 19 is pushed from the insertion region 24 to the opposite end of the first axial guide groove 18, it is pushed over the locking element 51. The locking mechanism 50, in particular the locking element 51, retains the first guide element 19, such that both components 2, 3 are retained against one another in the assembly state. If the components 2, 3 are pushed into the spreading state, the first guide element 19 slides back over the locking element 51. The two components 2, 3 are then unlocked from one another.

The locking mechanism 50 also has a spring element 52, such that the locking element 51 is spring-loaded. The locking mechanism also has a recess 53, such that spring element 52 can move.

Figure 3:
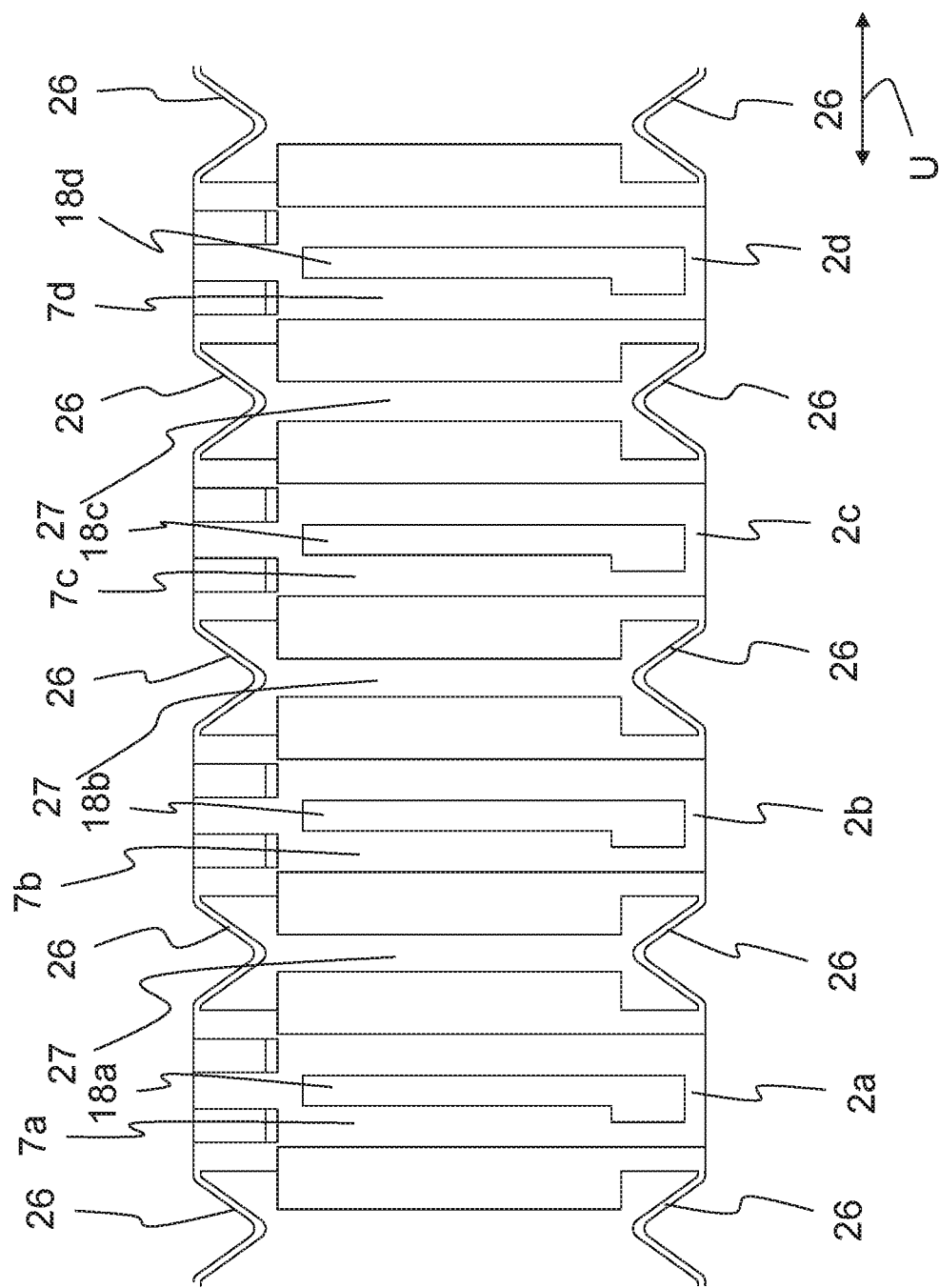
FIG. 3 shows a schematic top view of numerous first components connected together.

FIG. 3 shows a schematic top view of numerous interconnected first components 2a-d. Furthermore, for purposes of simplicity, features and their functions that have already been explained in reference to the preceding figures shall not be explained again. Furthermore, identical features or at least features having similar effects are given the same reference symbols as in the preceding and/or following figures. As such, some features may first be explained in reference to the following figures, for purposes of clarity.

The first components 2a-d are each the first component 2 in FIG. 2a. The components 2a-d each have a first spreading bevel 7a-d and a first axial guide groove 18a-d, wherein these features are only provided with one reference symbol, by way of example. The first components 2a-d are each connected to one another by means of a flexible connecting element 26. The flexible connecting elements 26 bridge an empty space, located in each case between two first components 2a-d. The first components 2a-d can therefore move in relation to one another due to the empty spaces 27 and the flexible connecting elements 26. As a result, the components 2a-d can move in relation to one another with the radial spacing A between the inner and outer contact surfaces 4, 5 increases.

Furthermore, the first components 2a-d are connected to one another in the circumferential direction U of the spreader structure 1. The first components 2a-d can also be releasably and/or permanently connected to one another. One portion of the first components 2a-d can be connected permanently, and another portion can be connected releasably to one another.

By stringing the first components 2a-d together in the circumferential direction U, an inner spreader ring can be formed with a number of first components 2a-d, which can be placed around the tube 30. The inner spreader ring can be composed of numerous first components 2a-d, as a matter of course. Furthermore, and arbitrary number of first components 2a-d can be joined together by the connecting elements 26, in order to accommodate the diameter of the tube 30.

This connecting of the first components 2a-d shown here is not limited to the first components 2a-d. Additionally or alternatively, the second components 3 can be connected to one another in the same manner, by means of the flexible connecting elements 26. There can also be empty spaces 27 between the second components 3, such that the second components 3 can move freely in relation to one another.

The numerous interconnected second components 3 can form an outer spreader ring.

The fact that the first and/or second components 2, 3 can move in relation to one another in the circumferential direction U when they are connected to one another with the flexible connecting elements 26, and when empty spaces 27 are formed between them, is also advantageous. When the two components 2, 3 are moved from the assembly state to the spreading state, the diameter of the inner spreader ring decreases, in that the first components 2 move toward one another. In contrast, the outer diameter of the outer spreader ring increases when the second components 3 are moved apart from one another. The flexible connecting elements 26 can stretch and compress.

Furthermore, deviations from a target cross section of the wall bore hole 29 and/or the tube 30 can be compensated for by means of the flexible connecting elements 26. The circular shape of the spreader structure 1 can be deformed as a result of the flexible connecting elements 26. The spreader structure 1 can consequently adapt to the shape of the actual cross section of the wall bore hole 29, and/or the tube 30. The target cross section is generally round, but the actual cross section of the wall bore hole 29 and/or the tube 30 may deviate therefrom, due to production conditions, resulting in an ellipse or an oval.

Figure 4A:
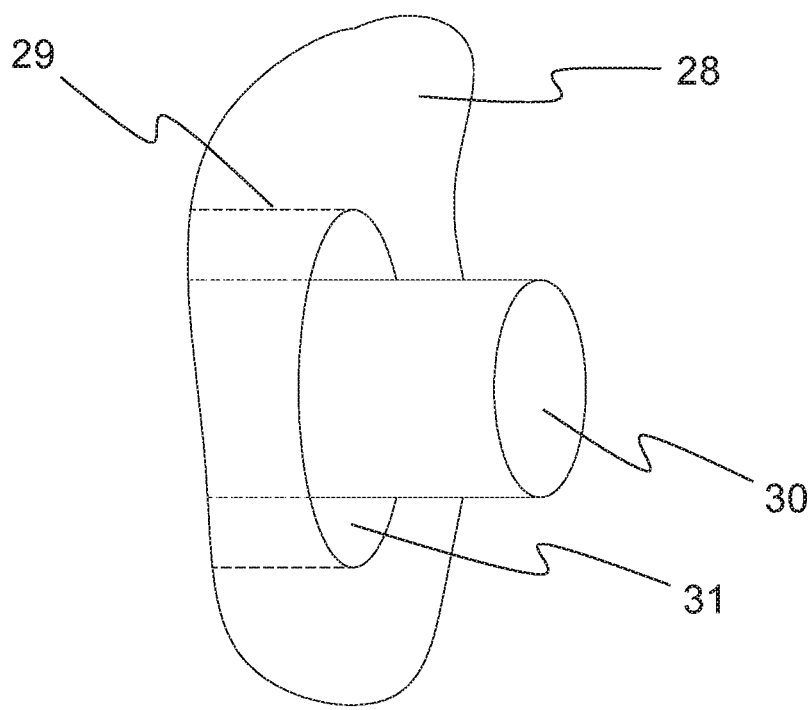
FIG. 4a shows a section of a wall with a wall bore hole, and a tube inserted therein.

FIG. 4a shows a section of a wall 28 with a hole 29 in it. There is a tube 30 in the hole 29, which passes through the wall 28. For technical reasons, the hole 29 is always larger than the diameter of the tube 30. Consequently, an annular gap 31 is always formed between the hole 29 and the tube 30. The annular gap 31 can be circular, oval, or elliptical.

Figure 4B:
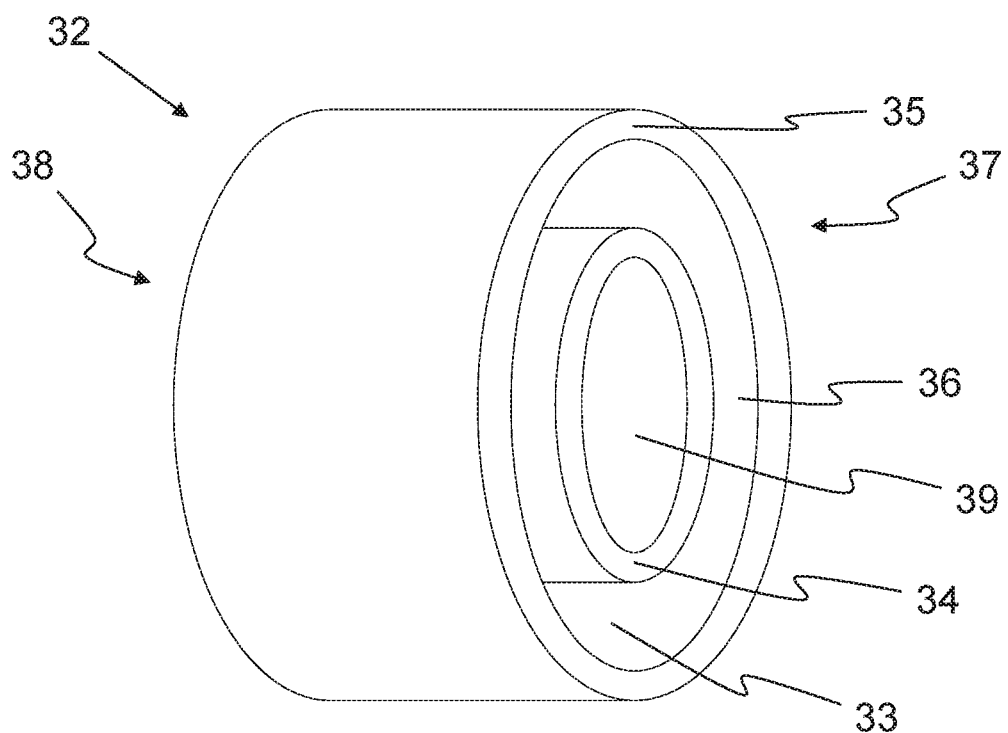
FIG. 4b shows a ring seal for sealing an annular gap.

For purposes of simplicity, features and their functions already described in reference to the preceding disclosure shall not be explained again in FIGS. 4a, 4b. Furthermore, identical features or at least features having similar effects are given the same reference symbols as in the preceding and/or following figures. As such, some features may first be explained in reference to the following figures, for purposes of clarity.

The ring seal 32 shown in FIG. 4b can be used to seal the annular gap 31. The ring seal 32 has an annular hollow space 33, in which the spreader structure 1 can be inserted. As a result, the spreader structure 1 can be located in the hollow space 33. The ring seal 32 also has a U-shaped cross section. The ring seal 32 has a first lip 34 and a second lip 35, both of which form a closed ring. The ring seal 32 also has a passageway 39, through which the tube 30 can be inserted. The first lip 34 therefore lies against the tube 30, when the tube 30 is inserted through the passageway 39. The first lip 34 can also be pressed against the tube 30 by means of the spreader structure 1, in particular the inner contact surface 4, such that the contact region between the ring seal 32 and the tube 30 is sealed.

The ring seal 32 is also placed in the annular gap 31. The second lip 35 then lies against the inner circumference of the wall bore hole 29. The second lip 35 can be pressed outward against the wall bore hole 29 by means of the spreader structure 1, in particular its outer contact surface 5, such that the contact region between the ring seal 32 and the wall bore hole 29 is sealed.

The spreader structure 1 is therefore located in the hollow space 33 between the two lips 34, 35 in an intended use.

The ring seal 32 also has an opening 36 on a first lateral surface 37, in particular an annular opening. The spreader structure 1 can be inserted into the hollow space 33 through the opening 36.

The hollow space 33 is closed at the second lateral surface 38, lying opposite the first lateral surface 37. Only the passageway 39 passes through the second lateral surface 38.

FIG. 5 shows the ring seal 32 with a spreader structure 1. Furthermore, for purposes of simplicity, features and their functions that were already described in reference to the preceding figures, shall not be explained again. Furthermore, identical features or at least features having similar effects are given the same reference symbols as in the preceding and/or following figures. As such, some features may first be explained in reference to the following figures, for purposes of clarity.

According to the present exemplary embodiment, the second component 3, or the numerous second components 3 joined together to form the outer spreader ring, is already placed in the hollow space 33 in the ring seal 32. The second component 3 bears with its outer contact surface 5 on the ring seal 32, or the second lip 35, respectively.

The first component 2, or the numerous first components 2 joined together to form the inner spreader ring are still located partially outside the hollow space 33. The inner contact surface 4 is only partially in contact with the ring seal 32, or the first lip 34, respectively.

The two components 2, 3, or the inner spreader ring and outer spreader ring formed by them, are in the assembly state at this point. The radial spacing A in the assembly state is substantially the same as, in particular no greater than, the radial expansion of the hollow space 33, or a radial path between the first and second lips 34, 35.

Furthermore, the first spreading mechanism 6 and the second spreading mechanism 11 are shown in FIG. 5. The first spreading mechanism 6 is formed by the first spreading bevel 7 of the first component 2, and the first spreading element 8 of the second component 3. The second spreading mechanism 11 is formed by the second spreading bevel 12 of the second component 3, and the second spreading element 13 of the first component 2.

If the two components 2, 3 are pushed in the axial direction X from the assembly state shown here to the spreading state, the first component 2 slides under the second component 3. The second component 3 remains stationary in relation to the ring seal 32. The second component 3 has a supporting surface 40 for this, which can brace against the ring seal 32, in particular against the second lip 35 shown here.

When the two components 2, 3 are pushed into the spreading state, the inner and outer contact surfaces 4, 5 are pushed apart by the two spreading mechanisms 6, 11, thus increasing their radial spacing A. Consequently, the ring seal 32 is spread apart. At this point, the first lip 34 is pressed against the tube 30, and the second lip 35 is pressed outward against the wall bore hole 29.

The first component 2 in the present exemplary embodiment has a striking surface 41 for pushing the two components 2, 3 toward one another in the axial direction X. A hammer can be used, for example, to strike the striking surface 41, in order to push the first component 2 against the second component 3 and the ring seal 32.

Figure 6:
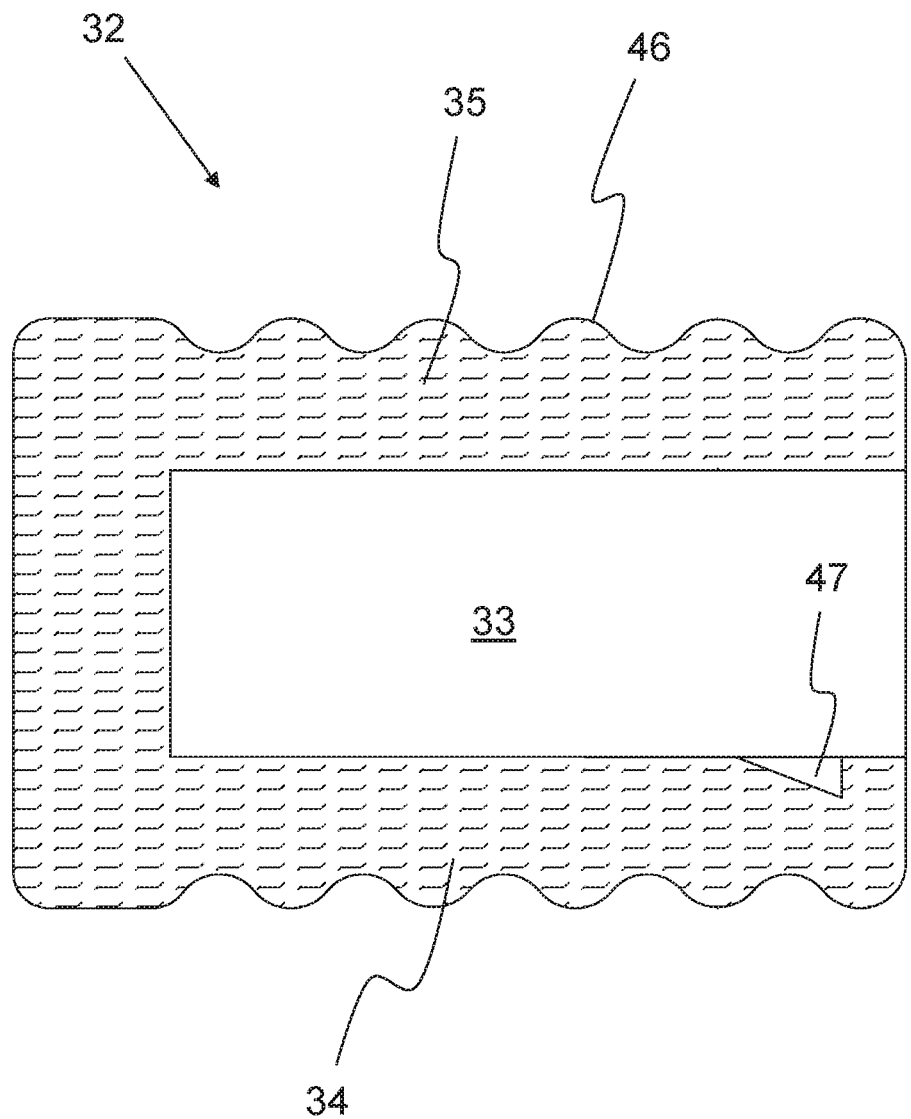
FIG. 6 shows a schematic sectional view of a ring seal with ribs.

FIG. 6 shows a sectional view of the ring seal 32. Furthermore, for purposes of simplicity, features and their functions already described in reference to the preceding figures shall not be explained again. Furthermore, identical features or at least features having similar effects are given the same reference symbols as in the preceding and/or following figures. As such, some features may first be explained in reference to the following figures, for purposes of clarity.

The ring seal 32 has numerous ribs 46. The ribs 46 can be located on the outside of the first lip 34. The ribs 46 thus face the tube 30.

Additionally or alternatively, the ribs 46 can also be located on the outside of the second lip 35. The ribs 46 then face the wall bore hole 29.

For purposes of simplicity, only one rib 46 has a reference symbol. Furthermore, the ribs 46 can be nubs, slats, or similar forms. The ribs 46 also extend in the circumferential direction around the ring seal 32.

The ring seal 32 can form a better seal for the wall bore hole 29 by means of the ribs 46. When the ring seal 32 is spread out, the ribs 46 can be pressed into the hollow spaces in the wall 28 and/or the tube 30, thus improving the seal.

The ring seal 32 in the present exemplary embodiment also has at least one notch 47. The first or second end 44, 45 of the first or second spreading element 8, 13 can latch into the notch 47, for example, such that the spreader structure 1 is connected to the ring seal 32.

Figure 7:
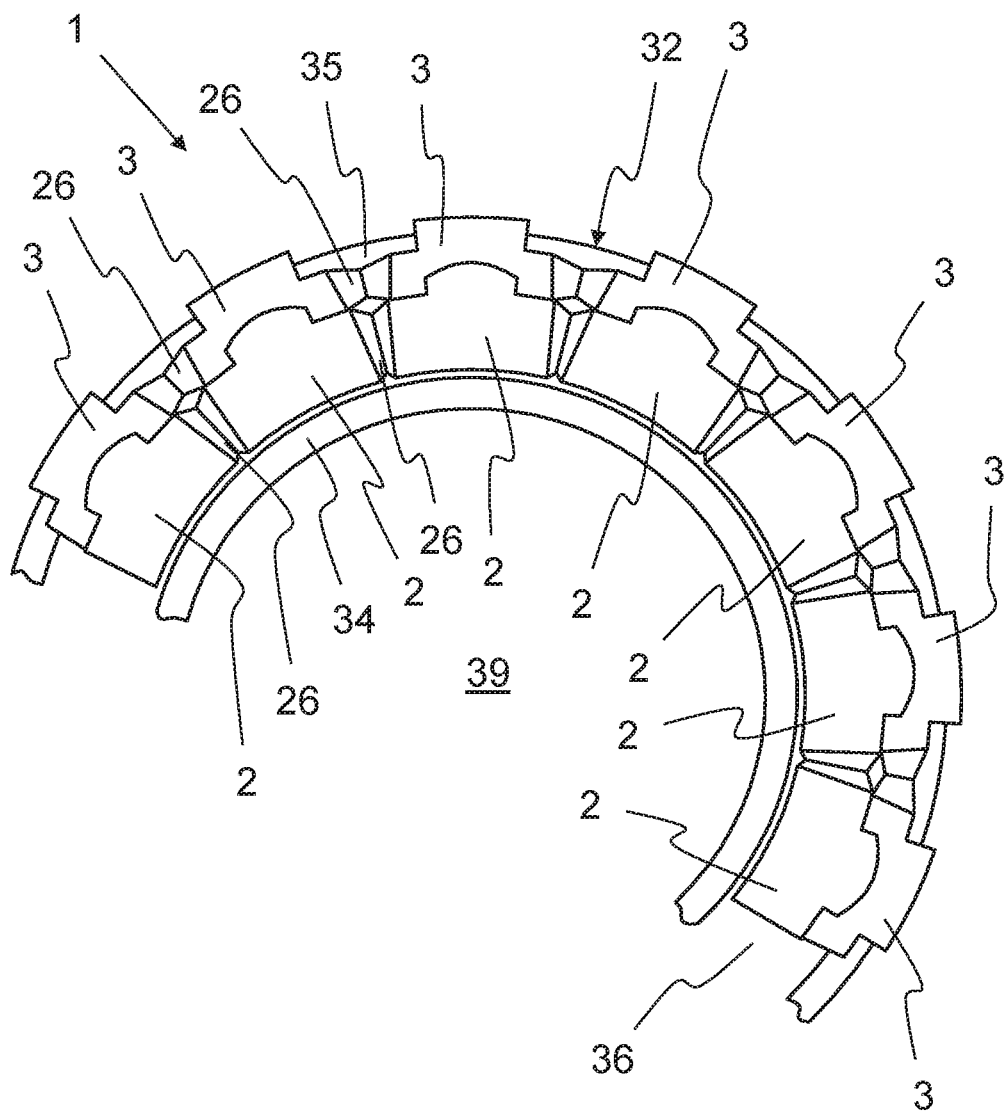
FIG. 7 shows a schematic front view of a spreader structure and a ring seal.

FIG. 7 shows a schematic front view of the spreader structure 1 and the ring seal 32. The perspective in this case is toward the opening 36 in the ring seal 32. Furthermore, for purposes of simplicity, features and their functions already described in reference to the preceding figures shall not be explained again. Furthermore, identical features or at least features having similar effects are given the same reference symbols as in the preceding and/or following figures. As such, some features may first be explained in reference to the following figures, for purposes of clarity.

The spreader structure 1 and the ring seal 32 are only shown in part here. The ring seal 32 and the spreader structure 1 form a closed circle. The spreader structure 1 has numerous first components 2 and numerous second components 3. The numerous components 2, 3 are arranged in the assembly state. The numerous components 2, 3 are therefore arranged as shown in FIG. 5. By way of example, the numerous second components 3 are located within the ring seal 32, while the first components 2 are still partially outside the ring seal 32.

According to the present exemplary embodiment, the first components 2 and the second components 3 each have a connecting element 26. For purposes of simplicity, only some of the connecting elements 26 have a reference symbol. Furthermore, the connecting elements 26 all have the same reference symbol, because they are all identical in this exemplary embodiment.

As is also shown herein, the connecting elements 26 that connect the first components 2 to one another are compressed when the spreader structure 1 forms a ring. The connecting elements 26 that connect the second components 3 to one another are stretched when the spreader structure 1 forms a ring. The increase or decrease in the radii can therefore be compensated for by the connecting elements 26 when the first and second components 2, 3 that are connected to one another form a ring, that is placed in the ring seal 32.

Figure 8:
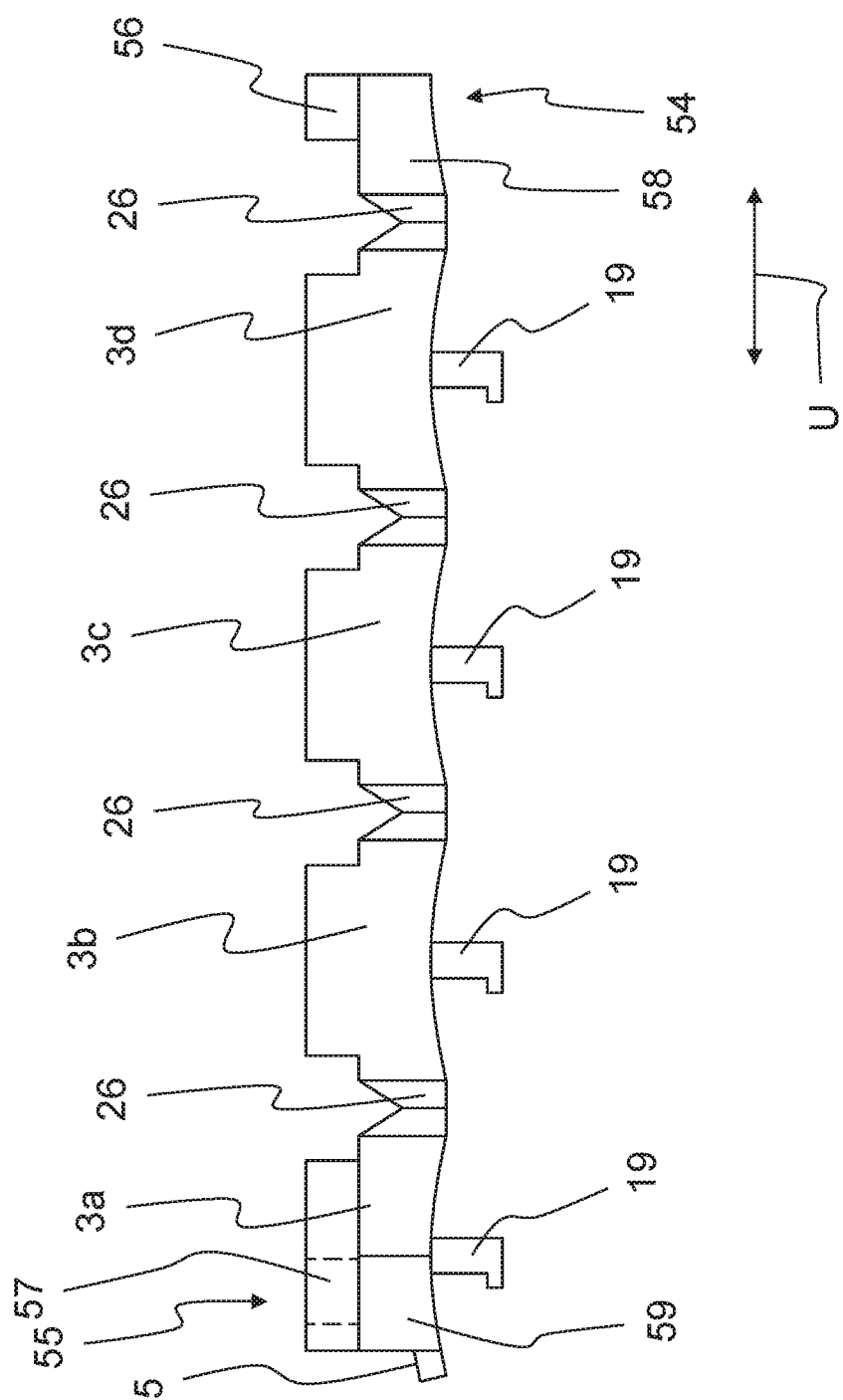
FIG. 8 shows a schematic front view of numerous second components 2 with a coupling mechanism.

FIG. 8 shows a schematic front view of numerous second components 3a-3d with a coupling mechanism. Furthermore, for purposes of simplicity, features and their functions already described in reference to the preceding figures shall not be explained again. Furthermore, identical features or at least features having similar effects are given the same reference symbols as in the preceding and/or following figures. As such, some features may first be explained in reference to the following figures, for purposes of clarity. Numerous of the second components 3a-3d that are shown here can be joined together with the coupling mechanism, such that the spreader structure 1 can be enlarged to any arbitrary size. The spreader structure 1 can be readily adapted to nearly any tube and/or hole diameter using the coupling mechanism. Four second components 3a-3d are connected to one another with the elastic connecting elements 26 according to the present exemplary embodiment. The four second components 3a-3d shown here have a coupling mechanism, such that each of the four second components 3a-3d can be connected to one another. The second components 3a-3d can be joined to one another in the circumferential direction U using the coupling mechanism.

The coupling mechanism comprises a first coupling element 54 and a second coupling element 55 in this case. The first coupling elements 54 in the numerous second components 3a-3d can be coupled to the second coupling elements 55 in numerous second components 3a-3d, not shown here.

According to the present exemplary embodiment, the first coupling element 54 has a pin 56, located on an extension 58 of the first coupling element 54 here. The second coupling element 55 has a pinhole 57 that corresponds to the pin 56. The pin 56 can be inserted into the pinhole 57. The second coupling element 55 also has a recess 59 in which the extension 58 can at least be partially placed.

According to the present exemplary embodiment, four second components 3a-3d contain the coupling mechanism, in particular the first and second coupling elements 54, 55. The coupling mechanism can also be placed on just one of the second components 3a-3d, or two of the second components 3a-3d. It is also conceivable for more of the interconnected second components 3a-3d to have the coupling mechanism.

The coupling mechanism is shown here for the second components 3a-3d. Additionally or alternatively, the first components 2a-2d can also have the coupling mechanism shown here. Additionally or alternatively, the first and/or second components 2, 3 can also have two coupling mechanisms, spaced apart in the axial direction X. As a result, the first and/or second components 2, 3 can be coupled to one another in a robust manner.

The first coupling element 54 can also be clipped to the second coupling element 55, such that both coupling elements 54, 55 can be permanently coupled to one another.

FIGS. 9a-9e show various views of the first components 2a-2d. For purposes of simplicity, features and their functions already described in reference to the preceding figures shall not be explained again. Furthermore, identical features or at least features having similar effects are given the same reference symbols as in the preceding and/or following figures. For purposes of clarity, not all features have a reference symbol. In particular, the reference symbols for identical features are omitted for the most part, for purposes of clarity. Reference is made to the description of FIG. 2a for a more detailed description of the first components 2a-2d. As such, some features may also first be described in reference to the following figures, for purposes of clarity.

Figure 9A:
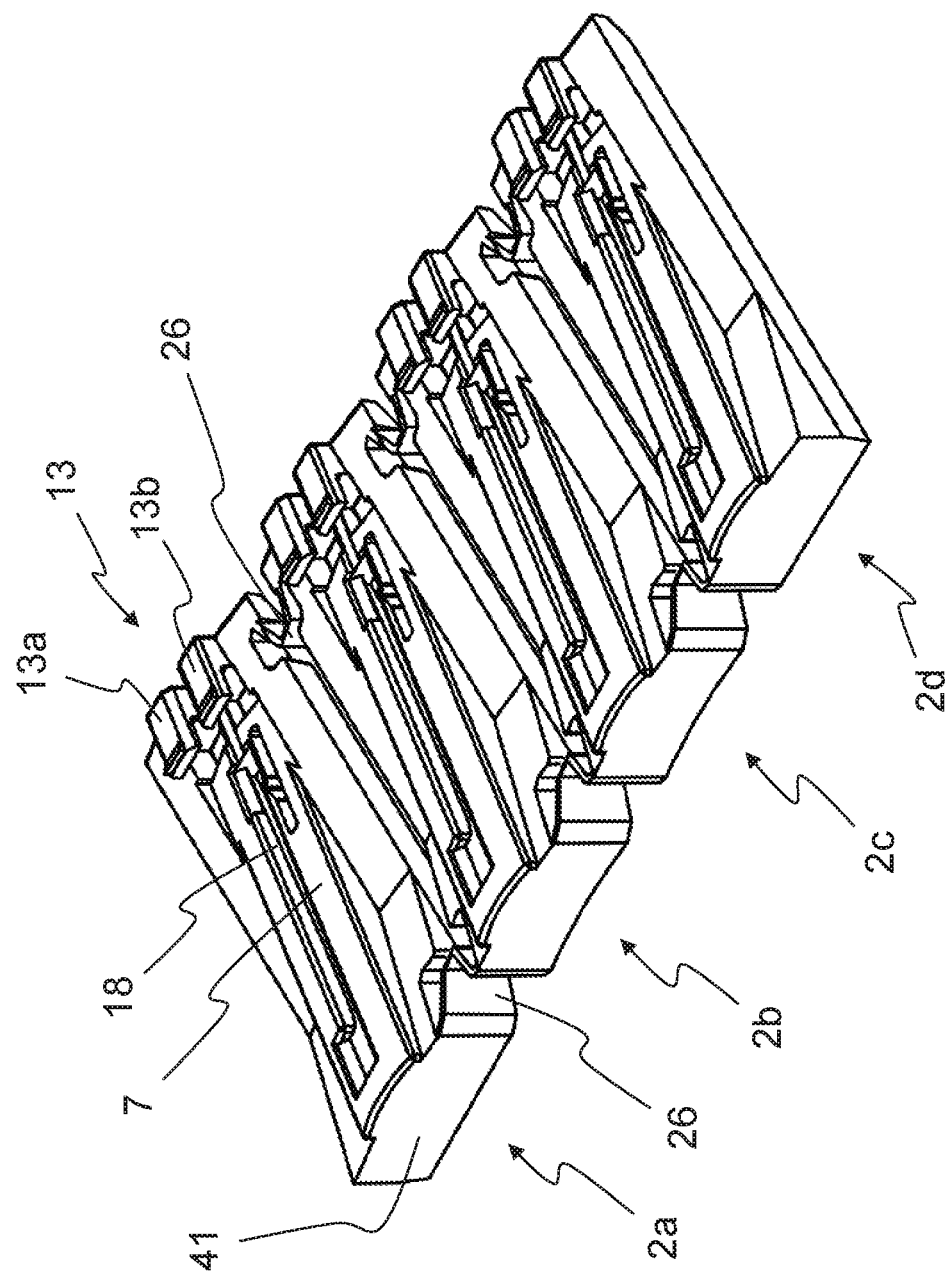
FIGS. 9a-e show numerous views of first components.

FIG. 9a shows a perspective view of four first components 2a-2d. For purposes of clarity, only some of the features have a reference symbol, on only one of the first components 2. As all of the first components 2 are identical, their features are also the same.

Each of the adjacent first components 2a-d is connected to one another by the connecting elements 26. Furthermore, the connecting elements 26 are also spaced apart in the axial direction X, such that the first components 2a-d are connected to one another at points that are spaced apart in the axial direction X.

Figure 9B:
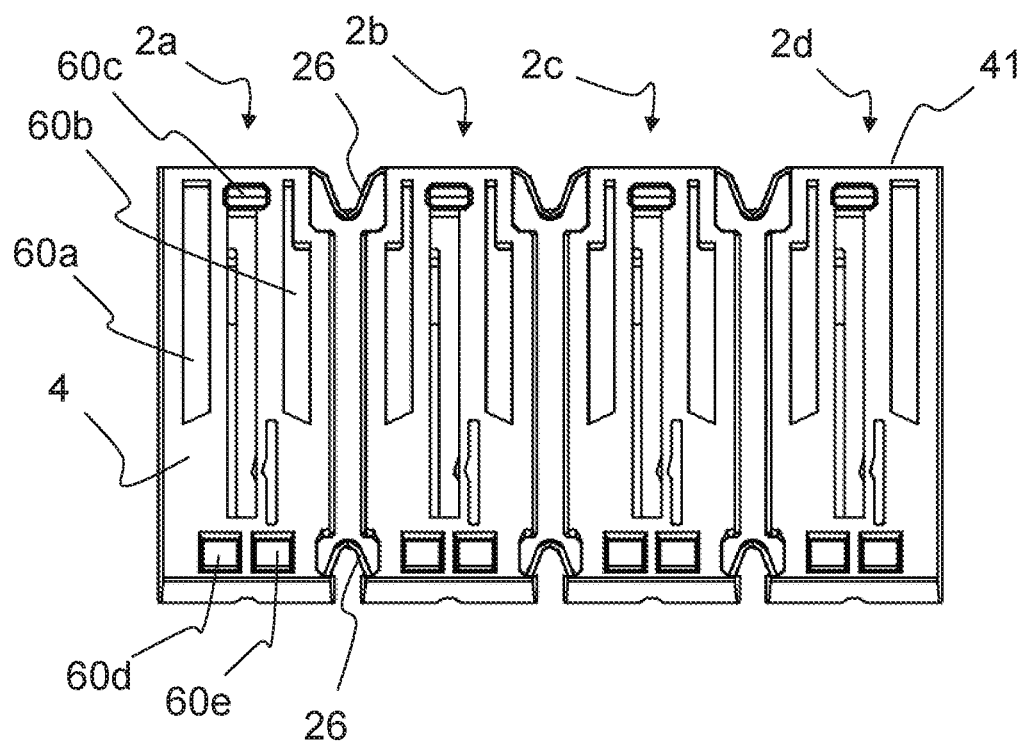

FIG. 9b shows a view from below, i.e. looking at the inner contact surfaces 4 of the first components 2a-d. The first components 2a-d each have a slit 60a-3 in the present exemplary embodiment. These slits 60 reduce the weight. The two second spreading elements 13a, b are located near the slits 60d-e.

Figure 9C:
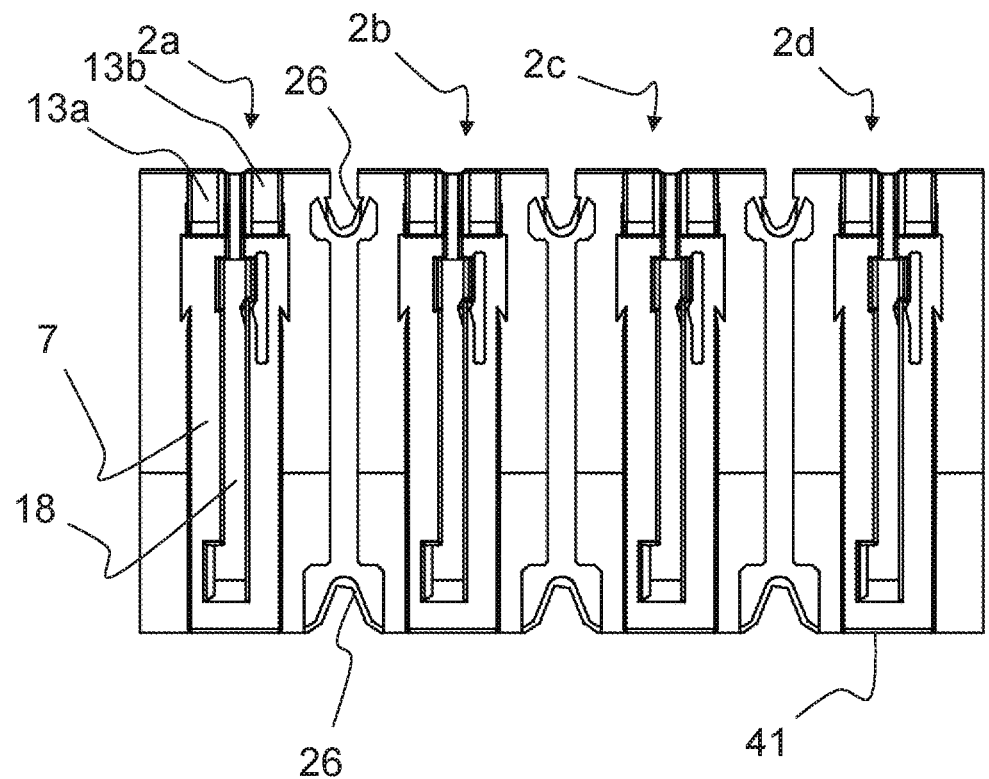

FIG. 9c shows a view from above, e.g. onto the first spreading bevels 7 on the first components 2a-d.

Figure 9D:
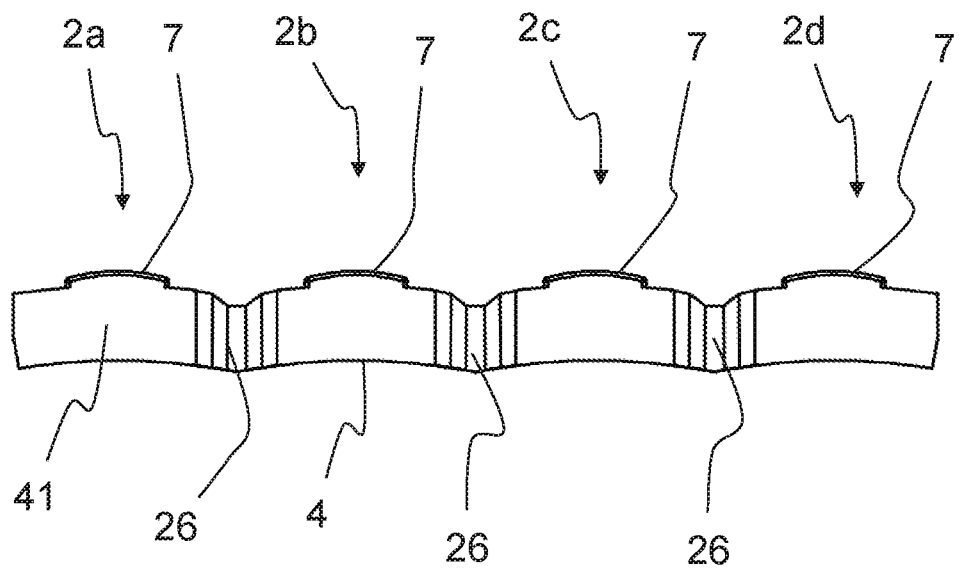

FIG. 9d shows a front view, i.e. looking at the bevel surfaces 41 of the first components 2a-d.

Figure 9E:
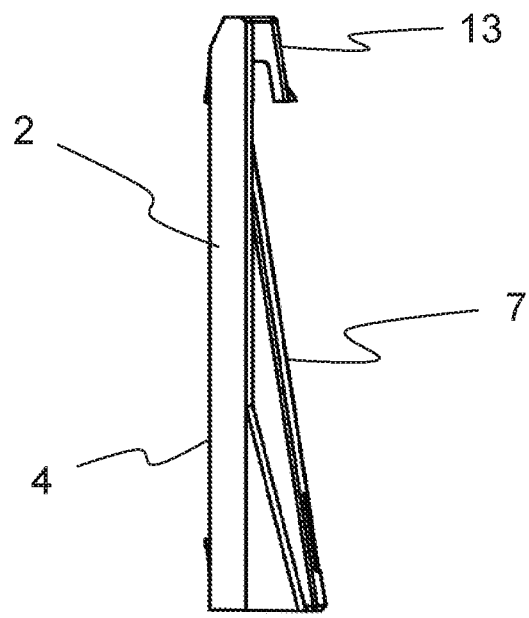

FIG. 9e shows a side view of at least one first component 2.

FIGS. 10a-d show numerous views of a second component 3. For purposes of simplicity, features and their functions already described in reference to the preceding figures shall not be explained again. Furthermore, identical features or at least features having similar effects are given the same reference symbols as in the preceding and/or following figures. For purposes of clarity, not all features have a reference symbol. In particular, in comparison with preceding and/or subsequent figures, the reference symbols for identical features are omitted for the most part, for purposes of clarity. Reference is made to the description of FIG. 2b for a detailed description of the second component 3. As such, some features may also first be described in reference to the following figures, for purposes of clarity.

Figure 10A:
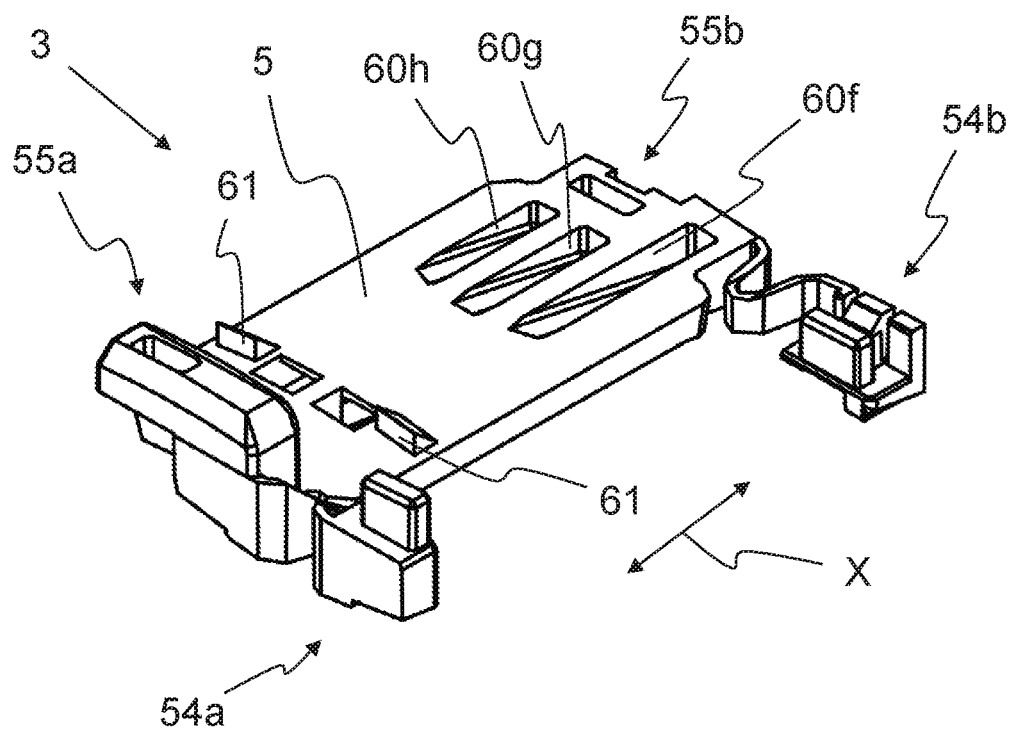
FIGS. 10a-d show numerous views of a second component.

FIG. 10a shows a perspective view from diagonally above, i.e. onto the outer contact surface 5 on the second component 3. Slits 60f-h are formed in the outer contact surface 5. These slits 60fh reduce the weight.

There is at least one coupling element 54 on the second component 3. The present exemplary embodiment has two first coupling elements 54a, b which are spaced apart from one another in the axial direction X. The second component 3 also has at least one second coupling element 55. The present exemplary embodiment has two second coupling elements 55a, b which are spaced apart from one another in the axial direction X. Any arbitrary number of second components 3 can be coupled to one another using the first and second coupling elements 54a, b and 55a, b. For this, the first coupling elements 54a, 54b of a second component 3 are coupled to the second coupling elements 55a, b of another second coupling element 3. The coupling mechanism formed by the at least one first and second coupling elements 54, 55 is described in greater detail in reference to FIG. 8. There is at least one hook element 61 in and/or on the outer contact surface, by means of which the second component 3 can be hooked into the ring seal, and in particular to the notch 47 located therein.

Figure 10B:
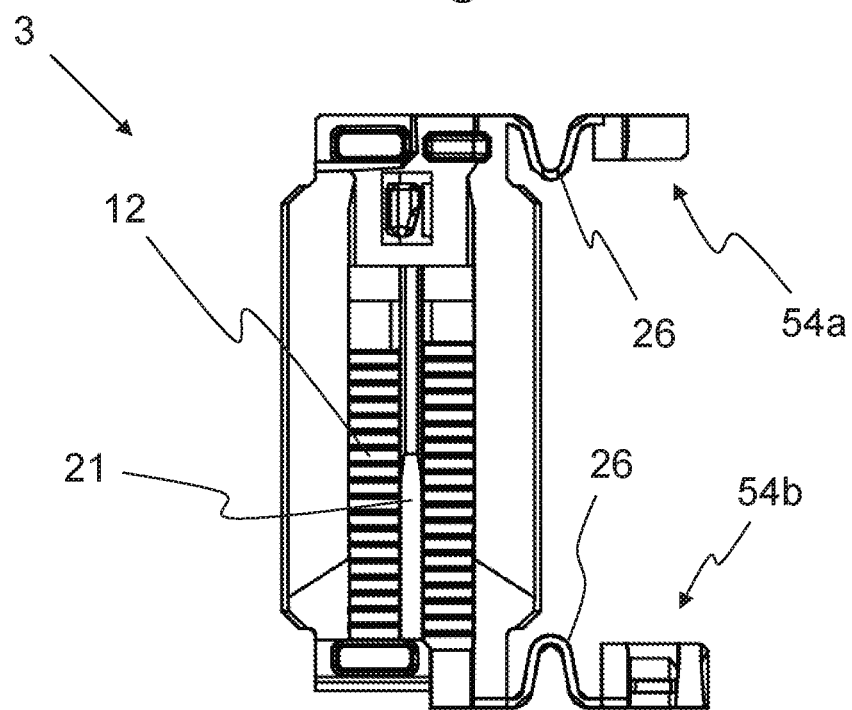

FIG. 10b shows a view from below of the second component 3, i.e. looking at the second spreading bevel 12. The at least one first coupling element 54a, b is located on a connecting element 26. The second spreading bevel 12 also forms a serrated latching surface.

Figure 10C:
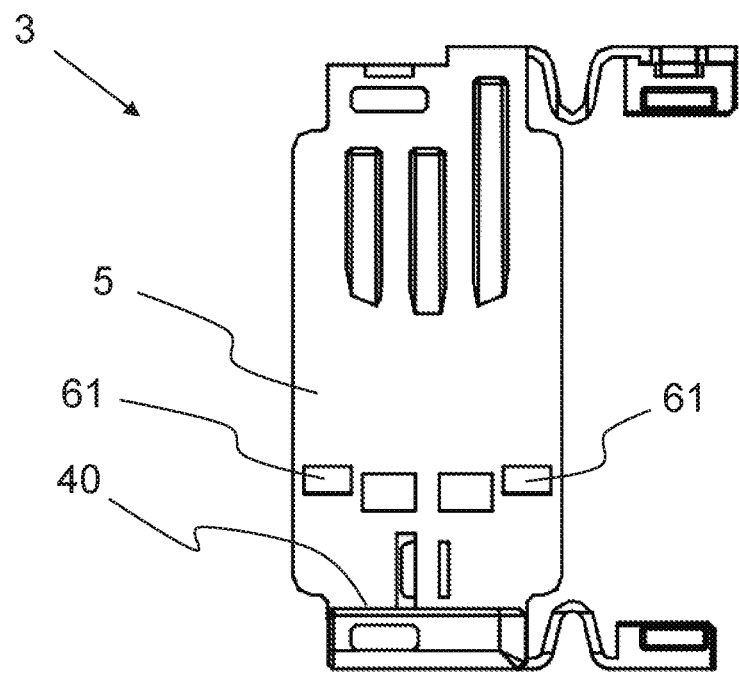

FIG. 10c shows a top view of the second component 3, i.e. looking at the outer contact surface 5.

Figure 10D:
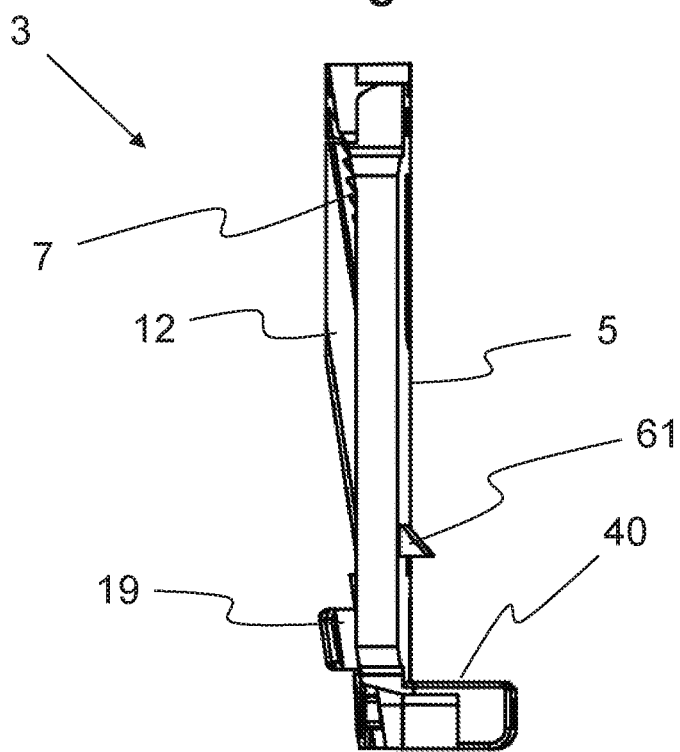

FIG. 10d shows a side view of the second component 3.

Figure 11A:
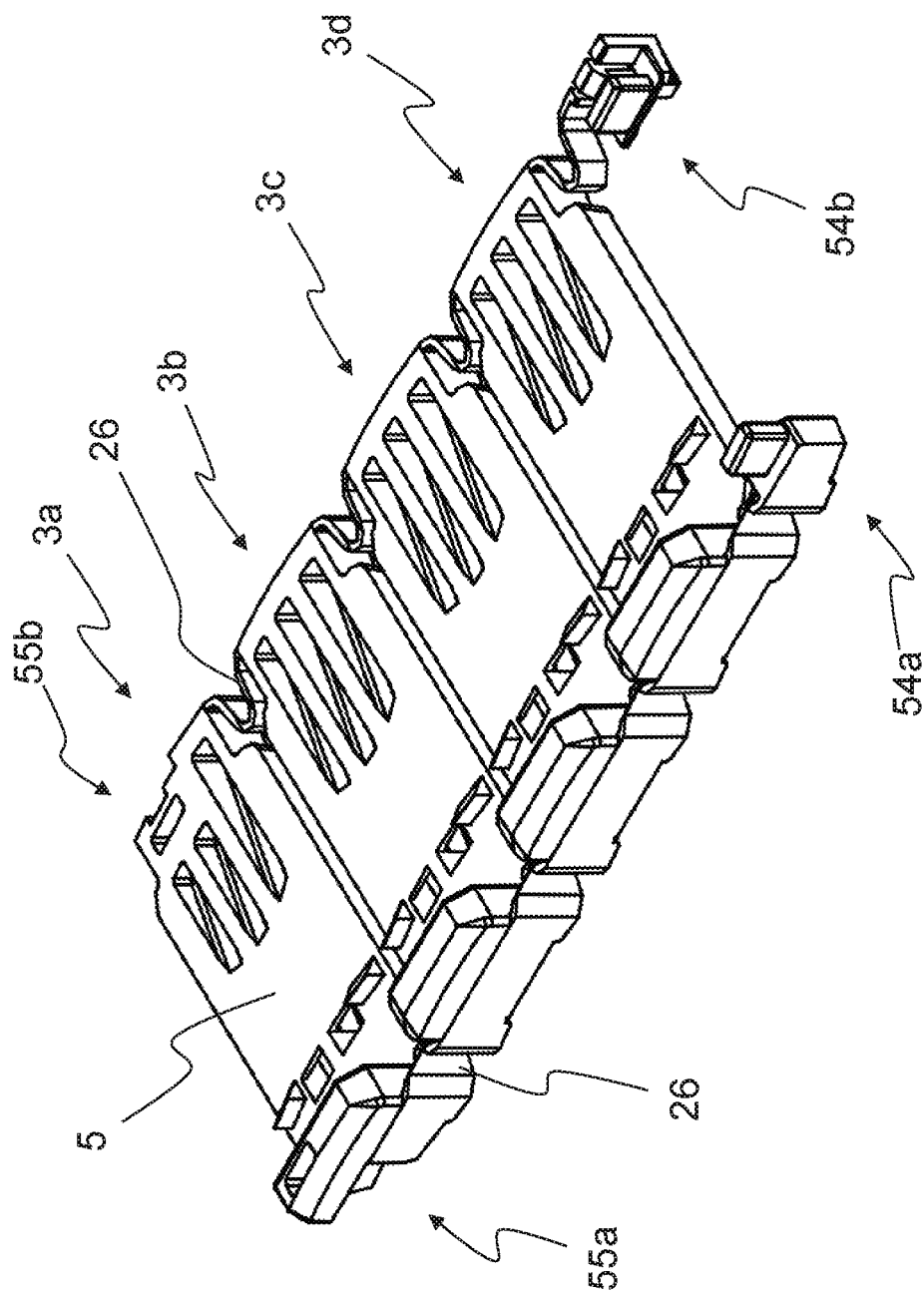
FIGS. 11a-c show numerous views of second components.
Figure 11B:
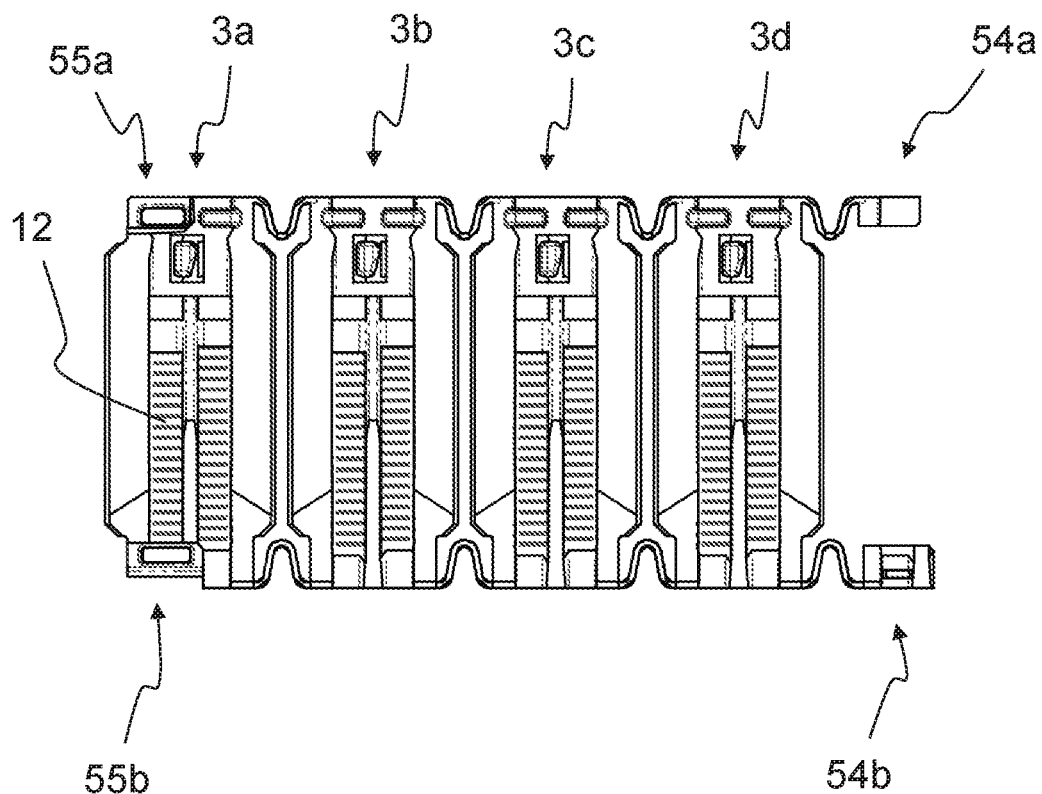
Figure 11C:
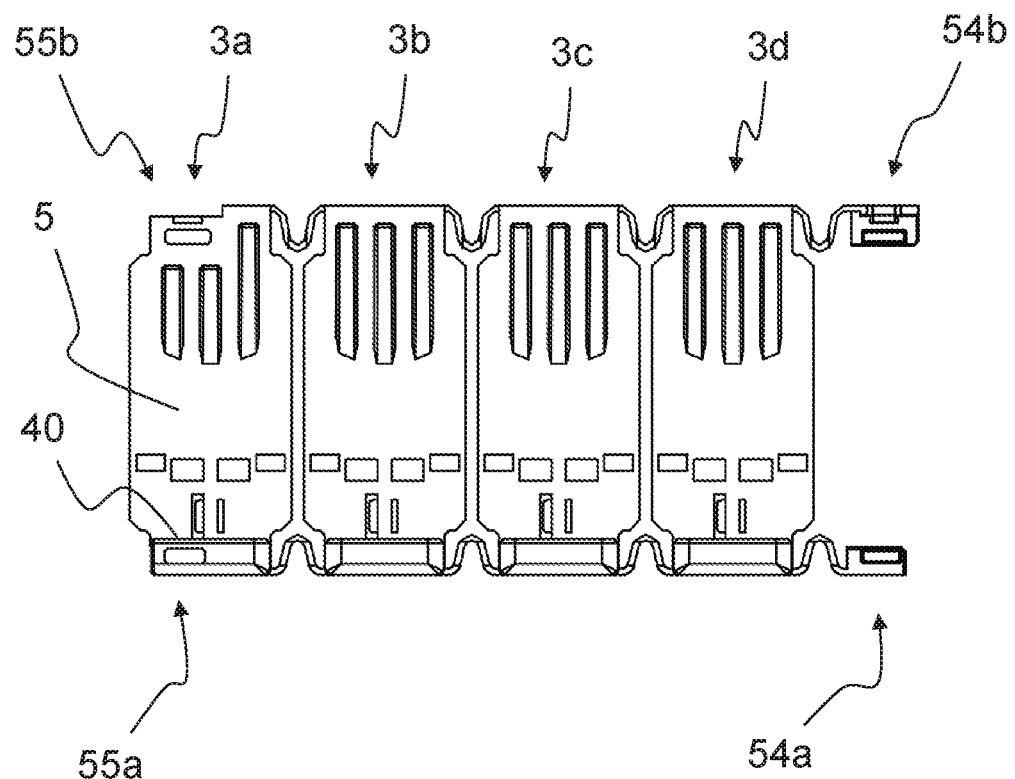

FIGS. 11a-c show different views of numerous second components 3. For purposes of simplicity, features and their functions already described in reference to the preceding figures shall not be explained again. Furthermore, identical features or at least features having similar effects are given the same reference symbols as in the preceding and/or following figures. For purposes of clarity, not all features have a reference symbol. In particular, in comparison with preceding and/or subsequent figures, the reference symbols for identical features are omitted for the most part, for purposes of clarity. Reference is made to the description of FIG. 2b for a detailed description of the second components 3a-d. As such, some features may also first be described in reference to the following figures, for purposes of clarity.

FIG. 11a shows four second components 3a-d connected to one another. The second components 3a-d are again connected using the elastic connecting elements 26. The four second components 3a-d each have the at least one first and second coupling elements 54, 55. Four second components 3a-d can be connected to one another, such that any arbitrary number of second components 3a-d can be connected to one another.

FIG. 11b shows a view from below, i.e. looking at the second spreading bevels 12 on the four second components 3a-d.

FIG. 11c shows a view from above, i.e. looking at the outer contact surfaces 5 on the four second components 3a-d.

Figure 12A:
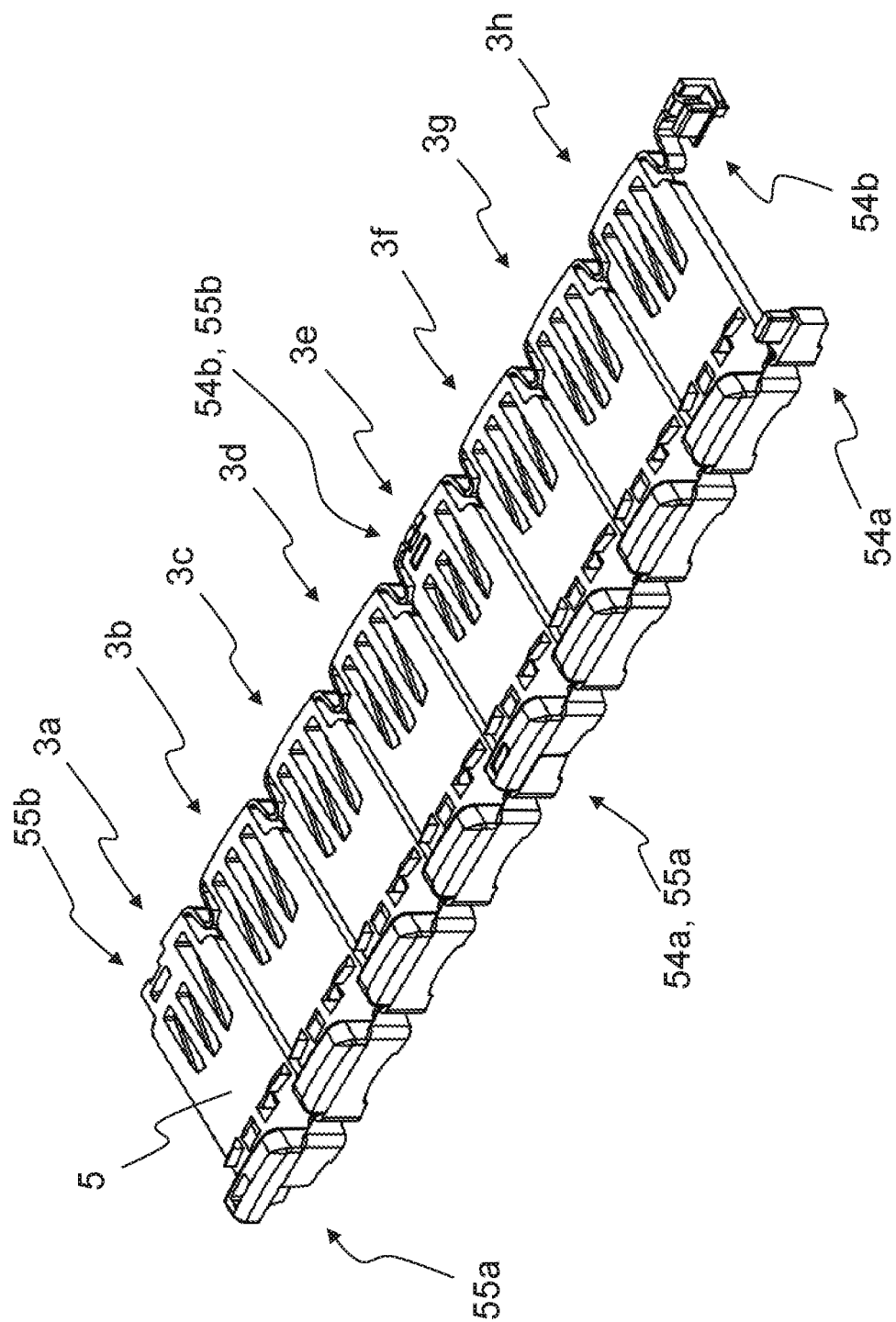
FIGS. 12a-b show numerous views of second components connected to one another.

FIGS. 12a, b show numerous views of second components 3a-h connected to one another. For purposes of simplicity, features and their functions already described in reference to the preceding figures shall not be explained again. Furthermore, identical features or at least features having similar effects are given the same reference symbols as in the preceding and/or following figures. For purposes of clarity, not all features have a reference symbol. In particular, in comparison with preceding and/or subsequent figures, the reference symbols for identical features are omitted for the most part, for purposes of clarity. Reference is made to the description of FIG. 2b for a detailed description of the second components 3a-h. As such, some features may also first be described in reference to the following figures, for purposes of clarity.

FIG. 12a shows a perspective view of numerous second components 3a-h. According to the present exemplary embodiment, the first four second components 3a-d form a first group of second components 3, and the second four components 3e-h form a second group of second components 3 (cf. FIG. 11a). The two groups are connected to one another between the fourth second component 3d and the fifth second component 3e. The at least one first and one second coupling elements 54a, 54b, 55a, 55b are coupled to one another. As a matter of course, just one second component 3 can be coupled thereto, as is shown, e.g., in FIGS. 10a-d. The group composed of second components 3 can also contain any arbitrary number of second components 3.

Figure 12B:
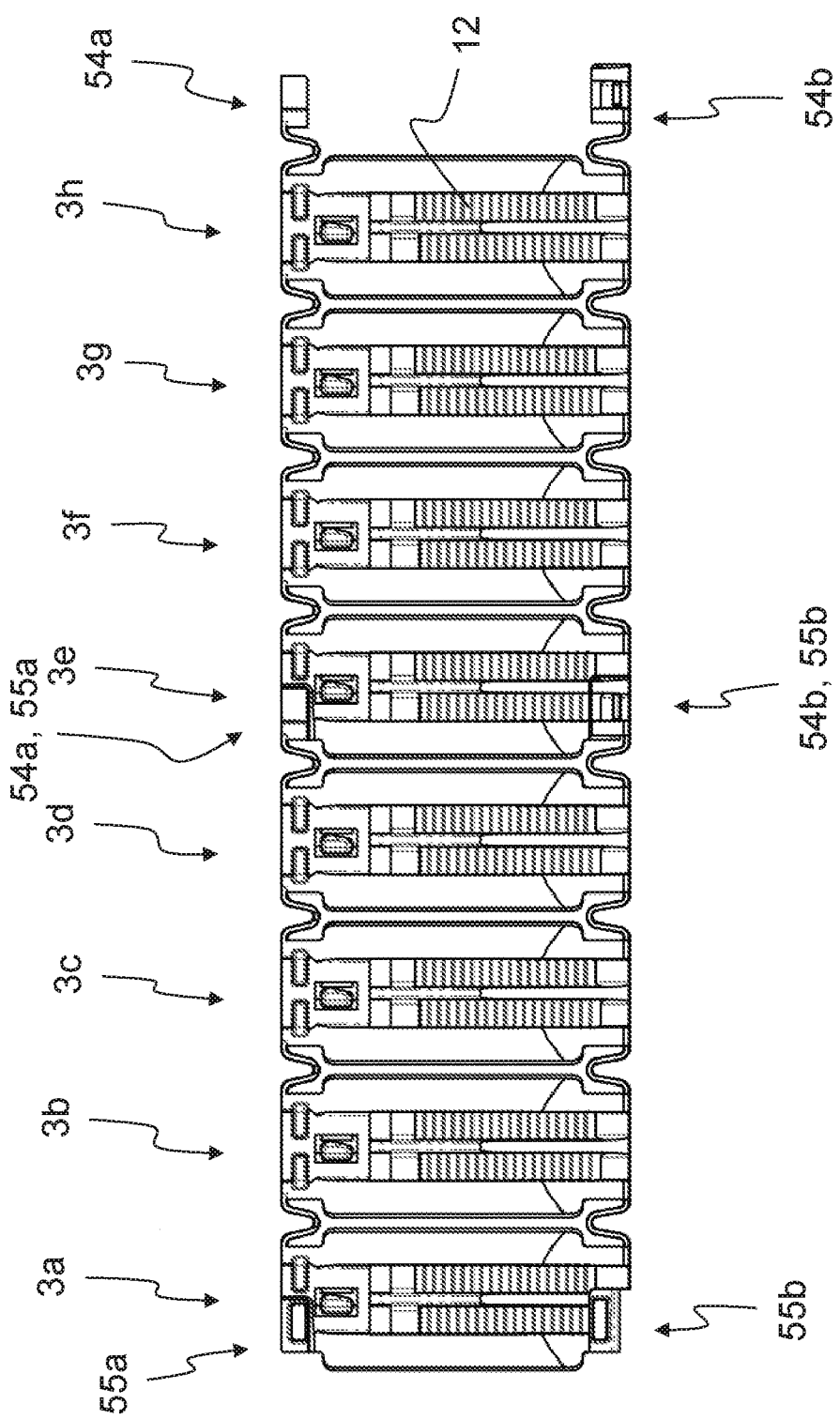

FIG. 12b shows a view from below, i.e. looking at the second spreading bevels 12 on the numerous second components 3a-h.

Figure 13:
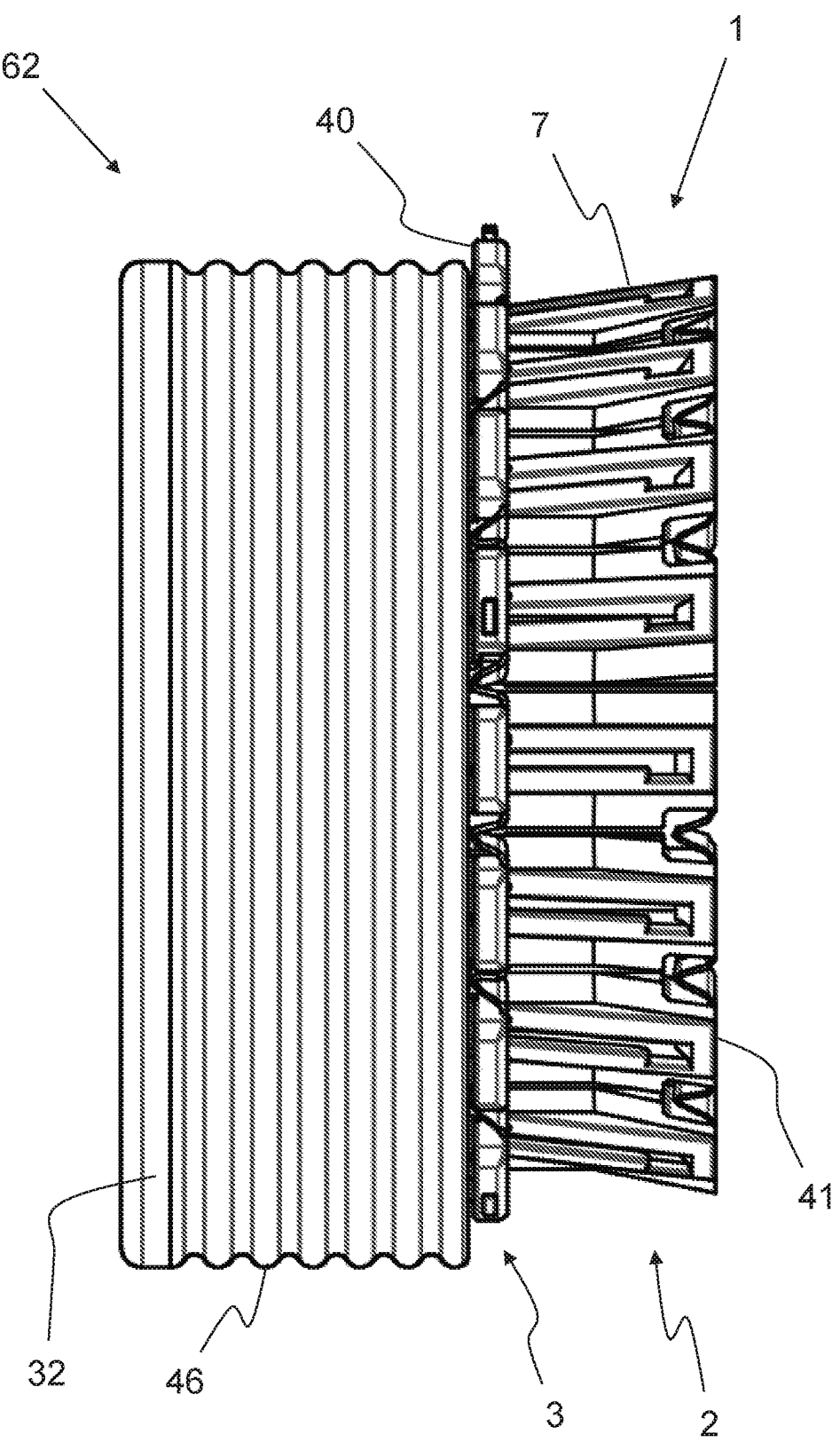
FIG. 13 shows a view of a sealing assembly that has a ring seal and a spreader structure.

FIG. 13 shows a view of a sealing assembly 62. For purposes of simplicity, features and their functions already described in reference to the preceding figures shall not be explained again. Furthermore, identical features or at least features having similar effects are given the same reference symbols as in the preceding and/or following figures. For purposes of clarity, not all features have a reference symbol. In particular, in comparison with preceding and/or subsequent figures, the reference symbols for identical features are omitted for the most part, for purposes of clarity. Reference is made to the descriptions of FIGS. 2a and 2b, as well as FIGS. 9-12 for a detailed description of the first components 2 and the second components 3. As such, some features may also first be described in reference to the following figures, for purposes of clarity.

The spreader structure 1 is at least partially located in the ring seal 32. The two components 2, 3, or the numerous first and second components 2, 3 are in the assembly state in relation to one another. The spreader structure 1 forms a ring.

By way of example, a hammer can be used to strike the striking surface 41 in order to displace the two components 2, 3, or the numerous first and second components 2, 3 toward one another in the axial direction X. The second component 3, or the numerous second components 3 bear with supporting surfaces 40 on the ring seal 32. Additionally or alternatively, the hook elements 61 in the second components 3 (cf. FIG. 10a, by way of example) can engage in notch 47 in the ring seal 32, such that the second component 3, or the numerous second components 3 is secured in place in relation to the ring seal 32. The first component 2, or the numerous first components 2, are driven under the second components 3 by the pressure exerted through the hammer striking the striking surfaces 41. Both components 2, 3 are displaced toward one another in the axial direction X, from the assembly state into the spreading state. The pressure can also be exerted by an actuator, e.g. a hydraulic actuator. The first components 2 are thus pushed under the second components 3.

When the two components 2, 3 are pushed together toward the spreading state, the radial spacing A between the inner and outer contact surfaces 4, 5 is increased. The ring seal 32 is then pressed inward against the tube 30 and/or outward against the wall bore hole 29. As a result, the annular gap 31 is sealed.

It should also be noted that in the drawings, for purposes of simplicity and/or clarity, features and their functions may be described in different figures. In particular, not all of the features are provided with reference symbols, in particular in FIGS. 3-13, for purposes of simplicity and/or clarity.

The present invention is not limited to the exemplary embodiments illustrated and described herein. Deviations in the framework of the invention are likewise possible, as are combinations of features, even if they have been illustrated and described in relation to different exemplary embodiments.

LIST OF REFERENCE SYMBOLS 1 spreader structure
2 first component
3 second component
4 inner contact surface
5 outer contact surface
6 first spreading mechanism
7 first spreading bevel
8 first spreading element
9 first section
10 second section
11 second spreading mechanism
12 second spreading bevel
13 second spreading element
14 first supporting region
15 second supporting region
16 third section
17 fourth section
18 first axial guide groove
19 first guide element
20 second axial guide groove
21 second guide element
22 first undercut
23 second undercut
24 insertion region
25 latching element
26 connecting element
27 empty space
28 wall
29 hole in the wall
30 tube
31 annular gap
32 ring seal
33 hollow space
34 first lip
35 second lip
36 opening
37 first lateral surface
38 second lateral surface
39 passageway
40 supporting surface
41 bevel surface
42 first cutout
43 second cutout
44 first end
45 second end
46 ribs
47 notch
48 first encompassing surface
49 second encompassing surface
50 locking mechanism
51 locking element
52 spring element
53 recess
54 first coupling element
55 second coupling element
56 pin
57 pinhole
58 extension
59 recess
60 slit
61 hook element
62 sealing assembly A radial spacing
X axial direction
R radial direction
U circumferential direction
α first angle
β second angle
H1 first height
H2 second height
V offset

The invention claimed is:

1. A spreader structure for a ring seal for sealing an annular gap, comprising a radially inner first component with an inner contact surface, a radially outer second component with an outer contact surface, and a first spreading mechanism formed between these two components that comprises a first spreading bevel formed on one of the two components, and a first spreading element formed on the other component, that can be moved along the first spreading bevel, wherein the two components can be displaced in relation to one another in an axial direction of the spreader structure from an assembly state to a spreading state, by means of which the first spreading element is moved from a first section of the first spreading bevel to a second section of the spreading bevel, enlarging a radial spacing between the inner contact surface and the outer contact surface, wherein the spreader structure has a second spreading mechanism formed between these two components, and the two spreading mechanisms are offset to one another in the axial direction of the spreader structure.

2. The spreader structure according to claim 1, wherein the two spreading mechanisms are separated from one another.

3. The spreader structure according to claim 1, wherein the two spreading mechanisms are offset to one another in a radial direction of the spreader structure.

4. The spreader structure according to claim 1, wherein the inner contact surface and the outer contact surface are parallel to one another, and/or the two spreading mechanisms are formed such that the inner contact surface and the outer contact surface can be displaced in parallel to one another.

5. The spreader structure according to claim 1, wherein the second spreading mechanism comprises a second spreading bevel formed on one of the two components and a second spreading element formed on the other component that can move along the second spreading bevel.

6. The spreader structure according to claim 1, wherein one of the two components contains the first spreading bevel and a second spreading bevel and the other component contains the first spreading element and a second spreading element, or each of the two components contains the first spreading bevel of one of the spreading mechanisms and the first spreading element of the other spreading mechanism.

7. The spreader structure according to claim 1, wherein the first spreading bevel and/or the first spreading element of the two spreading mechanisms are offset to one another in the axial and/or radial directions of the spreader structure.

8. The spreader structure according to claim 1, wherein the first spreading bevel and a second spreading bevel of the two spreading mechanisms are offset parallel to one another.

9. The spreader structure according to claim 1, wherein the spreader structure has a first and/or second guide mechanism formed between the two components, in order to guide the two components in the axial direction of the spreader structure, such that they move in relation to one another.

10. The spreader structure according to claim 1, wherein a first guide mechanism and a second guide mechanism are offset to one another in the axial direction of the spreader structure, such that the two components are guided to two different places in the axial direction.

11. The spreader structure according to claim 1, wherein a first guide mechanism comprises an axial guide groove and a guide element that moves in the axial guide groove.

12. The spreader structure according to claim 1, wherein a guide element has a first undercut at a free end that extends in the circumferential direction of the spreader structure, which engages in a form fit in a corresponding second undercut in an axial guide groove, such that the two components are coupled in a form fit to one another in the radial direction of the spreader structure.

13. The spreader structure according to claim 1, wherein an axial guide groove widens at an axial end, such that a first undercut of a guide element can be inserted in the radial direction into an axial guide groove to assemble the spreader structure.

14. The spreader structure according to claim 1, wherein a first axial guide groove of a first guide mechanism is formed in the first spreading bevel, and/or a first guide element of the first guide mechanism is formed on the first spreading element.

15. The spreader structure according to claim 1, wherein a first guide element forms a radial extension on the first spreading element.

16. The spreader structure according to claim 1, wherein a second axial guide groove of a second guide mechanism is formed in the second spreading element, and/or a second guide element of the second guide mechanism is formed in the second spreading bevel.

17. The spreader structure according to claim 1, wherein the spreader structure comprises a latching mechanism, which blocks an axial displacement of the two components toward the assembly state.

18. The spreader structure according to claim 1, wherein the latching mechanism has a serrated latching surface and an elastic latching element that corresponds to the latching surface.

19. The spreader structure according to claim 1, wherein the serrated latching surface is formed in the second spreading bevel, and/or the elastic latching element is formed on the second spreading element.

20. The spreader structure according to claim 1, wherein at least the two corresponding components form a spreader unit with their two spreading mechanisms, and the spreader structure comprises numerous spreader units distributed over the circumferential direction, which form a spreader ring.

21. The spreader structure according to claim 1, wherein the spreader ring is formed by an inner spreader ring comprising the first component, and/or an outer spreader ring comprising the second component.

22. The spreader structure according to claim 1, wherein an empty space is formed between two adjacent first and/or second components of two adjacent spreader units in the circumferential direction, such that these can move in relation to one another in the circumferential direction.

23. The spreader structure according to claim 1, wherein the adjacent components in the circumferential direction are connected via at least one flexible connecting element that bridges the empty space.

24. A sealing assembly for sealing an annular gap between a wall bore hole and an element in the wall bore hole, comprising a ring seal and a spreader structure for radially grouting the ring seal, wherein the spreader structure is formed according to claim 1.

25. The sealing assembly according to claim 24, wherein the ring seal contains an annular hollow space in which the spreader structure is at least partially located.

26. The sealing assembly according to claim 24, wherein the ring seal has a U-shaped cross section and/or an opening at one of its end surfaces.

* * * * *